(12) United States Patent
Erdozain, Jr. et al.

(10) Patent No.: US 12,261,649 B1
(45) Date of Patent: Mar. 25, 2025

(54) LOCALIZATION FOR RENDERING DIGITAL CONTENT

(71) Applicant: Apple Inc., Cupertino, CA (US)

(72) Inventors: Jack Erdozain, Jr., San Francisco, CA (US); Travis J. McQueen, Lee, NH (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 17/483,715

(22) Filed: Sep. 23, 2021

Related U.S. Application Data

(60) Provisional application No. 63/083,709, filed on Sep. 25, 2020.

(51) Int. Cl.
| | |
|---|---|
| *H04B 10/11* | (2013.01) |
| *H04B 10/114* | (2013.01) |
| *H04B 17/27* | (2015.01) |
| *G02B 27/01* | (2006.01) |
| *H04B 10/50* | (2013.01) |
| *H04B 10/516* | (2013.01) |
| *H04B 10/60* | (2013.01) |

(52) U.S. Cl.
CPC ........... *H04B 17/27* (2015.01); *H04B 10/114* (2013.01); *G02B 27/017* (2013.01); *H04B 10/11* (2013.01); *H04B 10/50* (2013.01); *H04B 10/516* (2013.01); *H04B 10/60* (2013.01)

(58) Field of Classification Search
CPC ...... H04B 17/27; H04B 10/114; H04B 10/11; H04B 10/50; H04B 10/516; H04B 10/60; G02B 27/017

USPC ................... 398/118–131, 182–201, 202–214
See application file for complete search history.

(56) References Cited

U.S. PATENT DOCUMENTS

| | | |
|---|---|---|
| 3,781,886 A | 12/1973 | Lank |
| 5,343,212 A | 8/1994 | Rose |
| 5,440,390 A | 8/1995 | Tirri |
| 7,415,212 B2 * | 8/2008 | Matsushita ............. G06F 3/002 398/189 |
| 7,435,940 B2 | 10/2008 | Eliasson |
| 9,779,309 B1 * | 10/2017 | Fink .................... G06F 16/7867 |
| 10,725,304 B1 | 7/2020 | Ratnam |
| 2001/0043626 A1 * | 11/2001 | Sakanaka ........... H04B 10/1127 372/8 |

(Continued)

OTHER PUBLICATIONS

U.S. Appl. No. 17/483,697, filed Sep. 23, 2021, Jack Erdozain Jr., et al.

(Continued)

*Primary Examiner* — Dibson J Sanchez
(74) *Attorney, Agent, or Firm* — S. Scott Foster; Kowert, Hood, Munyon, Rankin & Goetzel, P.C.

(57) ABSTRACT

Methods and apparatus for conveying directionality and distance information from a transmitter to a receiver within the coordinate system of the transmitter. Conveying the directionality and distance information to the receiver may, for example, reduce computational loads at the receiver. The signal from the transmitter may include information for rendering digital content and information indicating the direction and distance of the transmitter, and the receiver may render the digital content using the direction and distance to reduce processing at the receiver. Alternatively, the signal may include pre-rendered content based on the direction to further reduce processing at the receiver.

20 Claims, 26 Drawing Sheets

(56) References Cited

U.S. PATENT DOCUMENTS

| | | | |
|---|---|---|---|
| 2006/0192078 A1* | 8/2006 | Yang | G06F 3/017 |
| | | | 250/208.1 |
| 2010/0086218 A1* | 4/2010 | Tateno | G06V 20/647 |
| | | | 382/218 |
| 2011/0043661 A1 | 2/2011 | Podoleanu | |
| 2012/0032853 A1 | 2/2012 | Karkinen | |
| 2012/0120070 A1* | 5/2012 | Baillot | G08B 25/14 |
| | | | 345/419 |
| 2014/0098379 A1* | 4/2014 | Smits | A63F 13/213 |
| | | | 356/614 |
| 2014/0218765 A1* | 8/2014 | Sawayanagi | H04N 1/00111 |
| | | | 358/1.15 |
| 2014/0225916 A1* | 8/2014 | Theimer | H04B 10/1149 |
| | | | 345/633 |
| 2014/0375982 A1* | 12/2014 | Jovicic | G01B 11/14 |
| | | | 250/340 |
| 2015/0215040 A1* | 7/2015 | Dickson | H04B 10/1125 |
| | | | 398/131 |
| 2015/0310664 A1* | 10/2015 | Boussard | G06T 19/006 |
| | | | 345/633 |
| 2015/0349881 A1* | 12/2015 | Byers | H04B 10/11 |
| | | | 398/118 |
| 2016/0294472 A1 | 10/2016 | Palmer | |
| 2016/0357189 A1* | 12/2016 | Barrows | H04B 10/116 |
| 2017/0257594 A1* | 9/2017 | Goslin | H04N 5/44504 |
| 2017/0270637 A1 | 9/2017 | Perreault | |
| 2017/0276767 A1* | 9/2017 | Ho | G01S 5/163 |
| 2018/0081032 A1 | 3/2018 | Torruellas | |
| 2018/0088208 A1* | 3/2018 | Gagrani | H04W 64/003 |
| 2018/0191436 A1* | 7/2018 | Kadambala | G06T 7/248 |
| 2018/0234137 A1 | 8/2018 | Qu | |
| 2019/0004151 A1 | 1/2019 | Abediasl | |
| 2019/0056634 A1 | 2/2019 | Hosseini et al. | |
| 2019/0179426 A1* | 6/2019 | Ojala | G02B 27/017 |
| 2019/0212106 A1 | 7/2019 | Bortz | |
| 2019/0253701 A1* | 8/2019 | Himel | G01S 17/89 |
| 2019/0369942 A1 | 12/2019 | Lucas | |
| 2020/0049989 A1* | 2/2020 | Brown | G02B 27/017 |
| 2020/0328808 A1* | 10/2020 | Yang | H04B 10/1129 |
| 2021/0049361 A1* | 2/2021 | Drake | G06F 16/587 |
| 2021/0112647 A1 | 4/2021 | Coleman | |
| 2022/0368098 A1 | 11/2022 | Kim | |
| 2023/0224038 A1* | 7/2023 | Bluschke | H04B 10/116 |
| | | | 398/118 |
| 2023/0244828 A1 | 8/2023 | Wodrich | |

OTHER PUBLICATIONS

U.S. Appl. No. 17/483,706, filed Sep. 23, 2021, Travis J. McQueen., et al.

* cited by examiner

Transmitters relay directional data alongside information needed to calculate distance.

With this information the device receiving the AR asset can more easily render the correct angle and size of the content.

A transmitter which sends different data in different directions may encode the full asset pre-rendered to the device Localization Transmitter can now map the distance and observation angle of the receiver device(s)

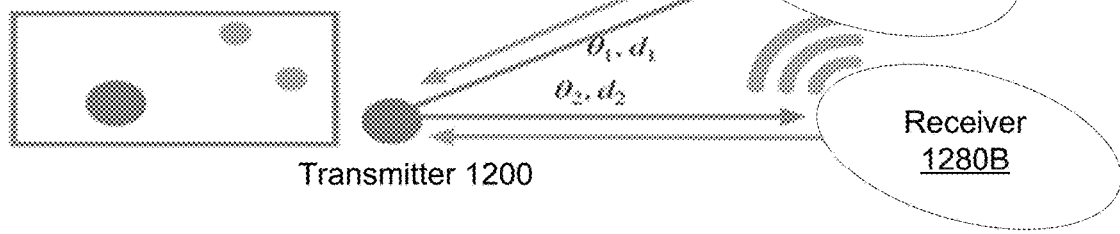

FIG. 12C

Localization

The transmitter and receiver(s) now know their relative locations. If the transmitter knows its absolution location and orientation, both the transmitter and receiver(s) can know their absolute location and orientation if transmitted by the transmitter.

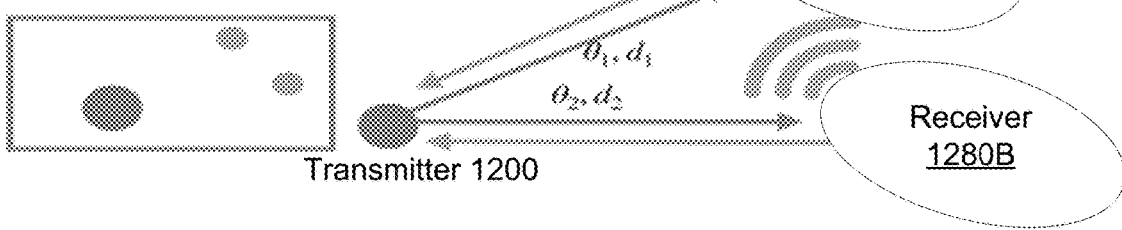

FIG. 12D

LOCALIZATION FOR RENDERING DIGITAL CONTENT

This application claims benefit of priority to U.S. Provisional Application Ser. No. 63/083,709, entitled "Localization for Rendering Digital Content," filed Sep. 25, 2020, and which is hereby incorporated herein by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Augmented reality (AR) is an overlay of computer generated information (referred to as virtual content) on the real world. An AR environment refers to a simulated environment in which one or more virtual objects are superimposed over a physical environment, or a representation thereof. Mixed reality (MR) combines computer generated information (virtual content) with real world images or a real world view to augment, or add content to, a user's view of the world. The simulated environments of VR and/or the augmented or mixed environments of AR and MR may be utilized to provide an interactive user experience for multiple applications, including but not limited to applications that add virtual content to a real-time view of the viewer's environment, interacting with virtual training environments, gaming, remotely controlling drones or other mechanical systems, viewing digital media content, interacting with the Internet, or the like. A general term to describe systems that implement VR, AR, and/or MR applications is computer-generated reality (CGR) systems.

In CGR systems, there is a mixing of real content with digital content. Two predominant conventional models for anchoring digital content to reality are referential models and algorithmic models. Under the referential model, a simple tag (e.g., a QR code sticker, Bluetooth® Low Energy (BLE) device, etc.) may provide a reference to an observer (e.g., a person wearing or carrying a CGR-enabled device) about where to obtain the content and possibly how to anchor it. Under the algorithmic model, on the observer's CGR-enabled device, machine vision algorithms parse sensor data (e.g., camera feeds) to identify objects, and look for content that may be attached to certain identified objects using available information including but not limited to location, time of day, installed applications, and personalization preferences. However, both of these models for anchoring digital content to reality have drawbacks, for example privacy concerns for both the observer and the owner of the identified objects, and the question of who determines what digital content is relevant to show a particular observer.

SUMMARY

Embodiments of methods and apparatus for conveying directionality and distance information from a transmitter (e.g., a broadcast tag) to a receiver (e.g., a steerable receiver) within the coordinate system of the transmitter are described. A receiver receives a signal (e.g., an infrared, near-infrared, or visible light signal) that encodes digital information specific to a transmitter in an environment. The signal includes information (e.g., wavelength, polarization, and/or modulation) that varies based on observation angle. The receiver may estimate direction of the transmitter in the environment based at least in part on the received signal. Intensity of the signal may be used to determine distance of the transmitter to the receiver. Conveying the directionality and distance information to the receiver may, for example, reduce augmented reality (AR)/computer vision (CV) computational loads at the receiver.

These methods and apparatus may, for example be implemented in systems for providing reality-anchored digital content in an environment to simplify the processing of digital content on the receiver side. An example system includes relatively simple light-based unidirectional, line-of-sight, high bandwidth transmitters (also referred to as broadcast tags) and steerable receivers that may be attached to or integrated in various devices including but not limited to head-mounted devices (HMDs) and hand-held devices. A broadcast tag may broadcast light (e.g., light in the infrared or near-infrared spectrum) in which particular information corresponding to the broadcast tag is encoded according to a protocol. A device including a steerable receiver may be carried or worn by a user (also referred to as an observer) to locate, receive, and decode information from one or more broadcast tags integrated in, attached to, or associated with objects or persons in an indoor environment such as a room, or in outdoor environments. The information communicated by the transmitter(s) to the receiver may, for example, include whole content bundles that can be used to display virtual content associated with the respective objects or persons.

Embodiments of the methods and apparatus described herein may be implemented in any CGR system. An example application of the methods and apparatus described herein is in handheld devices such as smartphone, pad, or tablet devices. Another example application of the methods and apparatus described herein is in head-mounted devices (HMDs).

BRIEF DESCRIPTION OF THE DRAWINGS

FIGS. 12A through 12D illustrate returning observation data from a receiver to a transmitter for localization, according to some embodiments.

Figure 1A:
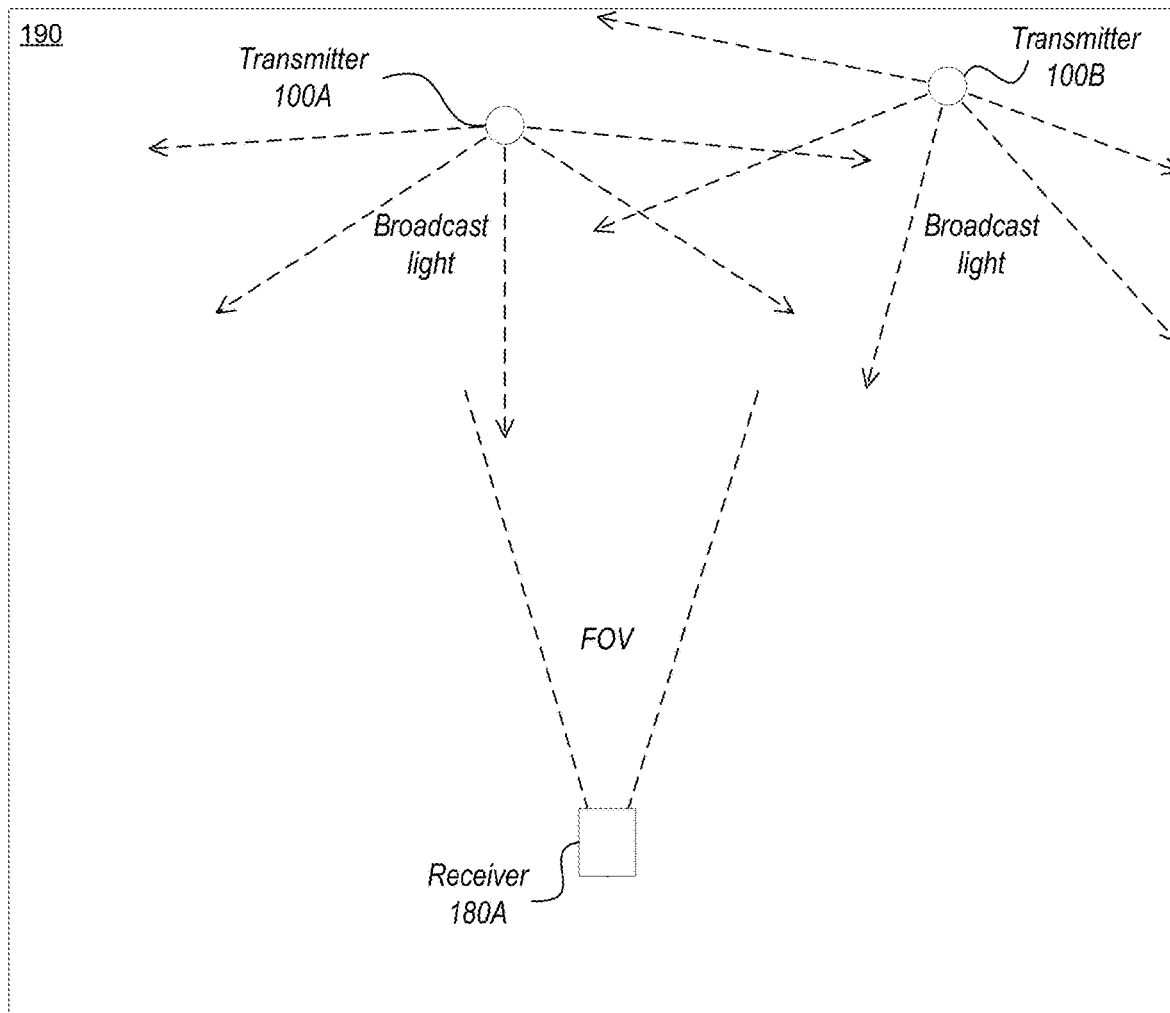
FIGS. 1A through 1C illustrate providing reality-anchored digital content in an environment, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing reality-anchored digital content are described. Relatively simple light-based unidirectional, line-of-sight, high bandwidth transmitters (also referred to as broadcast tags) are described. A steerable receiver is also described that may be attached to or integrated in various devices including but not limited to head-mounted devices (HMDs) and hand-held devices. A broadcast tag may broadcast light (e.g., light in the infrared or near-infrared spectrum) in which particular information corresponding to the broadcast tag is encoded according to a protocol. A device including a steerable receiver may be carried or worn by a user (also referred to as an observer) to locate, receive, and decode information from one or more broadcast tags integrated in, attached to, or associated with objects or persons in an indoor environment such as a room, or in outdoor environments. The information communicated by the transmitter(s) to the receiver may, for example, include whole content bundles that can be used to directly render virtual content associated with the respective objects or persons, and/or to locate, obtain, and render virtual content associated with the respective objects or persons.

By providing broadcast tags and steerable receivers as described herein, receiver-enabled devices such as augmented reality (AR) devices (e.g., HMDs) can be moved around to access digital information associated with different objects in an environment. In addition, a receiver-enabled device can act as "glue" or a bridge between broadcast-enabled devices. The spatial specificity of the transmitters and receivers provides a very natural and seamless human interface. A person wearing a receiver-enabled device can just look at an object; if the object has a broadcast tag, the person can interact with the object digitally. In addition, transmitters can be selected without changing the observer's view direction and without requiring the observer to look at the respective objects. For example if multiple transmitters are within the field of view of an observer, the steering capability of the receiver can be used to select data from one transmitter at a time without requiring the observer to change their view direction. In some embodiments, multiple transmitters may be presented to the observer, and the observer may select an object of interest corresponding to a particular transmitter. For example, in some embodiments when using a handheld device such as a smartphone, the user may tap a representation of the object on the screen to select the object that data should be received from. In some embodiments when using a device that has gaze tracking technology, gaze tracking may be used to select from among transmitters within the field of view.

In embodiments, since communications between the broadcast tags and steerable receivers is unidirectional, the broadcasters (e.g., the owners of the broadcast tags) may have no knowledge about who is listening. Additionally, since whole data bundles can be broadcast by the broadcast tags to the steerable receivers, all data can remain on-device (i.e., on the broadcast tags), with full functionality maintained.

In some embodiments, the data rate capability between a broadcast tag and a steerable receiver may be insufficient for some applications. In these cases, the broadcast data may be or may include a reference to content available elsewhere, for example in the cloud; the receiver can then access the content from the other source according to the provided reference. The extra bandwidth of these broadcasts, when compared to other referential implementations, allow for precise local control of the content.

Providing Reality-Anchored Digital Content

Figure 1B:
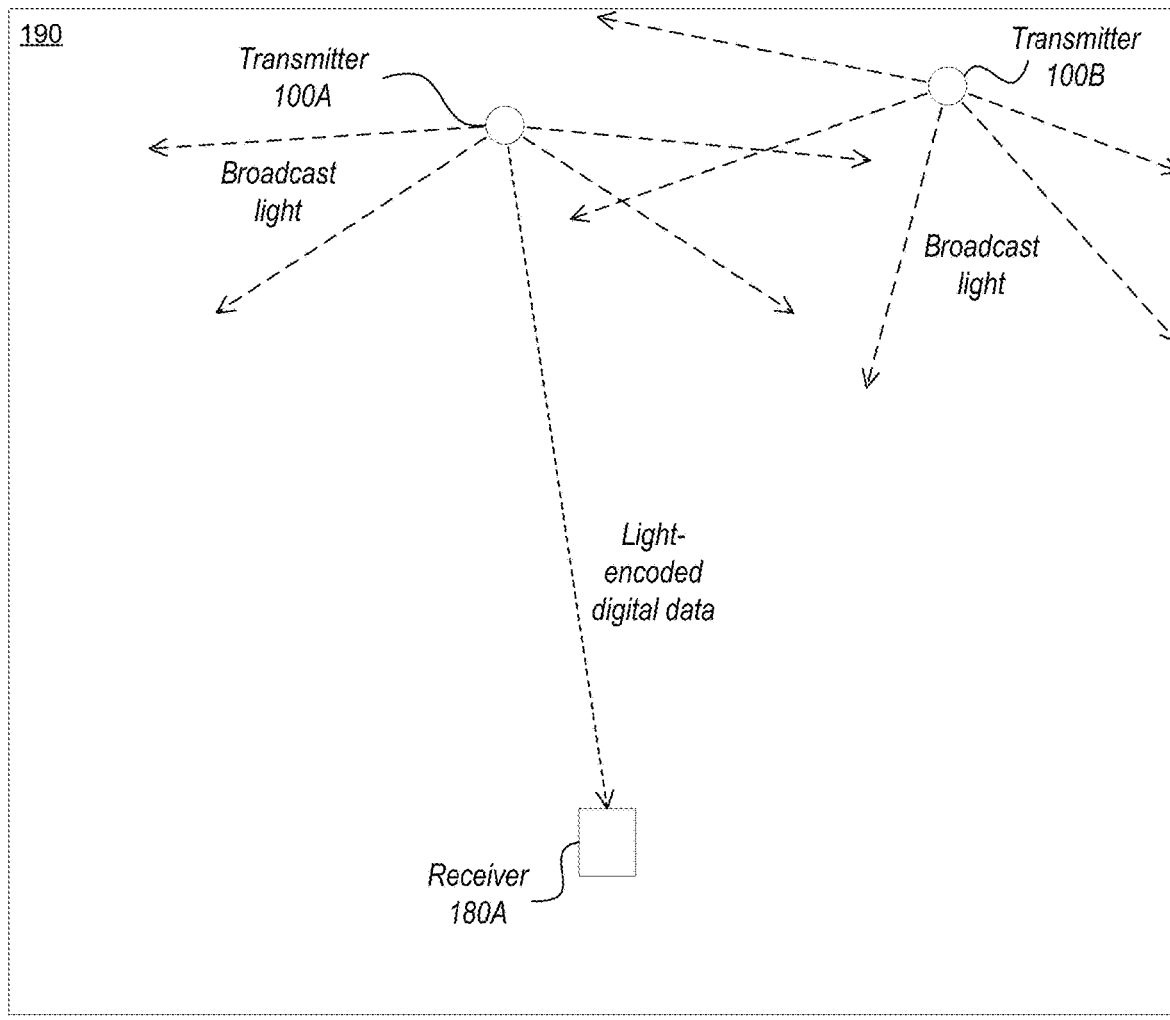
Figure 1C:
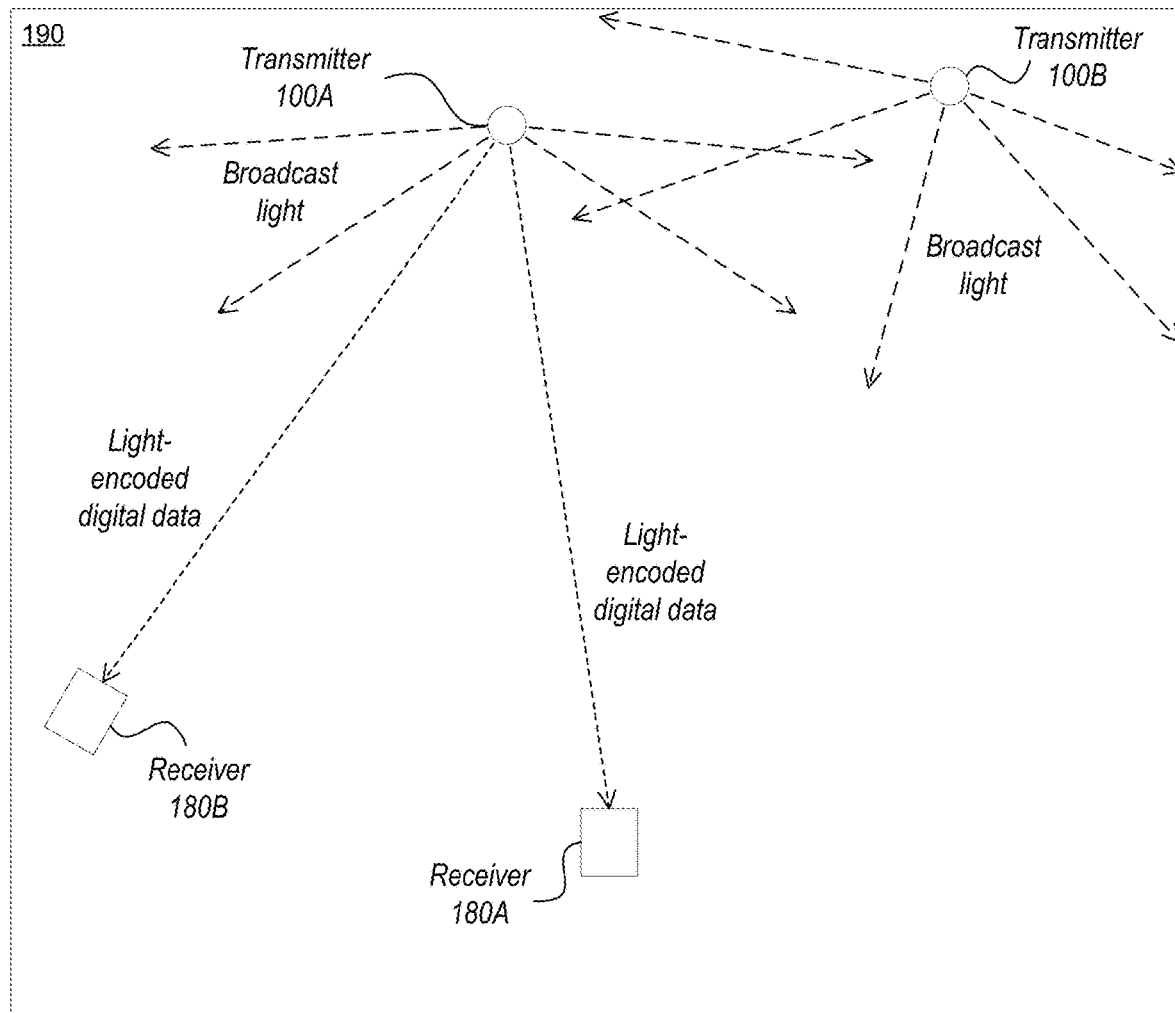

FIGS. 1A through 1C illustrate providing reality-anchored digital content in an environment, according to some embodiments. FIG. 1A illustrates a receiver 180A associated with a person (referred to as an observer) in an environment 190. Environment 190 may be any indoor or outdoor setting. Environment 190 includes one or more transmitters 100 (also referred to as broadcast tags), in this example transmitters 100A and 100B, that are integrated in, attached to, or associated with objects or persons in environment 190. Each transmitter 100 may emit light (e.g., light in the infrared or near-infrared spectrum) over a relatively wide range (e.g. 140-180 degrees). However, note that a given transmitter 100 may emit light over a narrower range if desired. A given transmitter 100 may emit light in which particular information corresponding to an object or person associated with the transmitter 100 is encoded according to a protocol. Receiver 180A may include a camera (e.g., a CMOS camera) with a field of view (FOV) that captures images or video of the environment 190. Receiver 180A may process the information captured by the camera to search for broadcast tags 100 in the environment 190.

As shown in FIG. 1B, receiver 180A has detected transmitter 100A in the environment 190. A steerable element of receiver 180A may then be used to direct and focus a light beam from transmitter 100A on a detector element that may include one or more photodiodes. The detector element captures the encoded information in the light beam from transmitter 100A. One or more processors integrated in or attached to the receiver 180A may then decode the encoded information, and may render digital content for the object or person associated with the transmitter 100A for viewing by the observer, e.g. on a mobile device such as a smartphone, tablet or pad device, or HMD associated with the observer.

In FIG. 1C, a second observer with a receiver 180B is in the environment. Receiver 180B may also detect transmitter 180A, capture the encoded information from the light beam, decode the encoded information, and render digital content for the object or person associated with the transmitter 100A for viewing by the second observer, e.g. on a mobile device associated with the second observer.

Since receivers 180A and 180B are simultaneously receiving the same encoded information from the transmitter 180A, the virtual content displayed to the two observers is synchronized. In some embodiments, relative position information may be encoded in or derived from the encoded information received at the two receivers 180, and this information may be used to adjust the viewpoint of the displayed virtual content as necessary.

Note that either receiver 180A or 180B may instead or also detect and process the signal from transmitter 100B. Also note that a transmitter 100 may move in an environment, for example if the transmitter 100 is associated with a person. In addition, an observer with a receiver 180 may move, or may move the receiver 180. Thus, in some embodiments, a receiver 180 may implement tracking algorithms so that the receiver 180 can track a light signal (e.g., an infrared, near-infrared, or visible light signal) from a transmitter 100 that it has "locked on to".

Figure 25A:
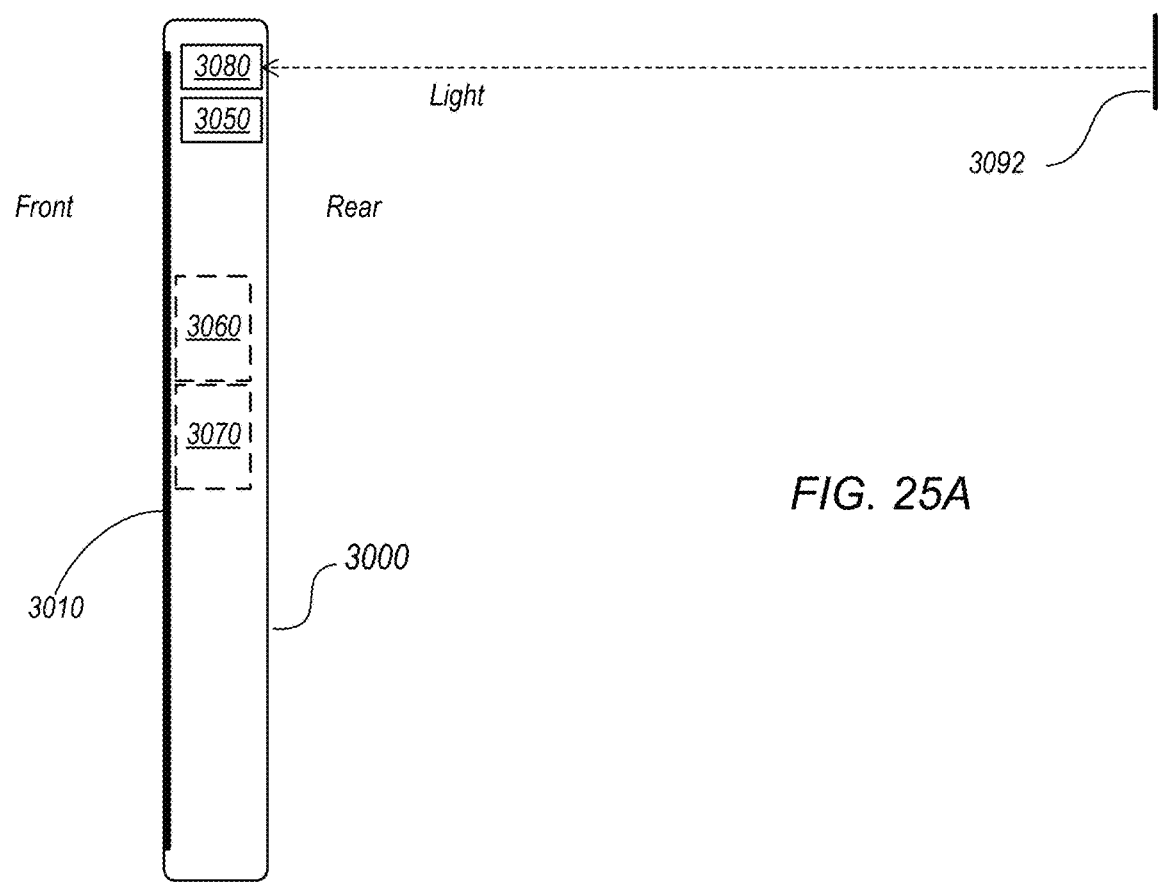
FIGS. 25A and 25B are block diagrams illustrating a device that may include or be attached to a steerable receiver, according to some embodiments.
Figure 25B:
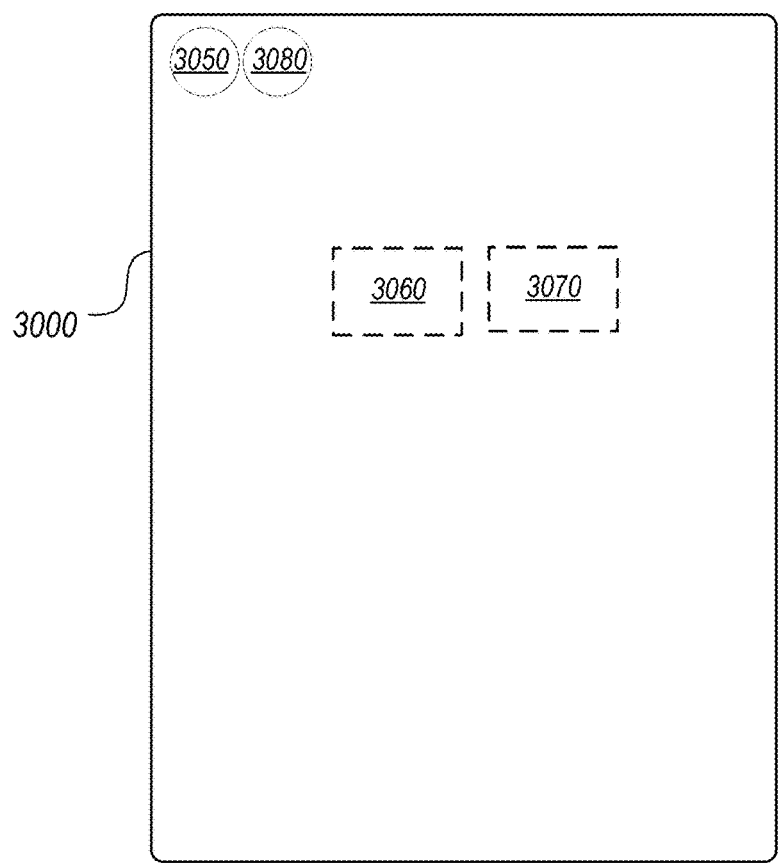

An example application of the methods and apparatus as described herein is in handheld devices such as smartphone, pad, or tablet devices. The steerable receiver components (e.g., a camera, steerable element, and photodiode detector) may be attached to or integrated in the device, and the device may be carried or moved by a user to locate and receive information from one or more transmitters (broadcast tags) integrated in, attached to, or associated with objects or persons in an indoor environment such as a room, or in outdoor environments. The information communicated by the transmitter(s) may, for example, be used to locate, obtain, and/or render virtual content associated with the respective objects or persons. FIGS. 25A and 25B illustrate a handheld device that may include or be attached to a steerable receiver, according to some embodiments.

Figure 26A:
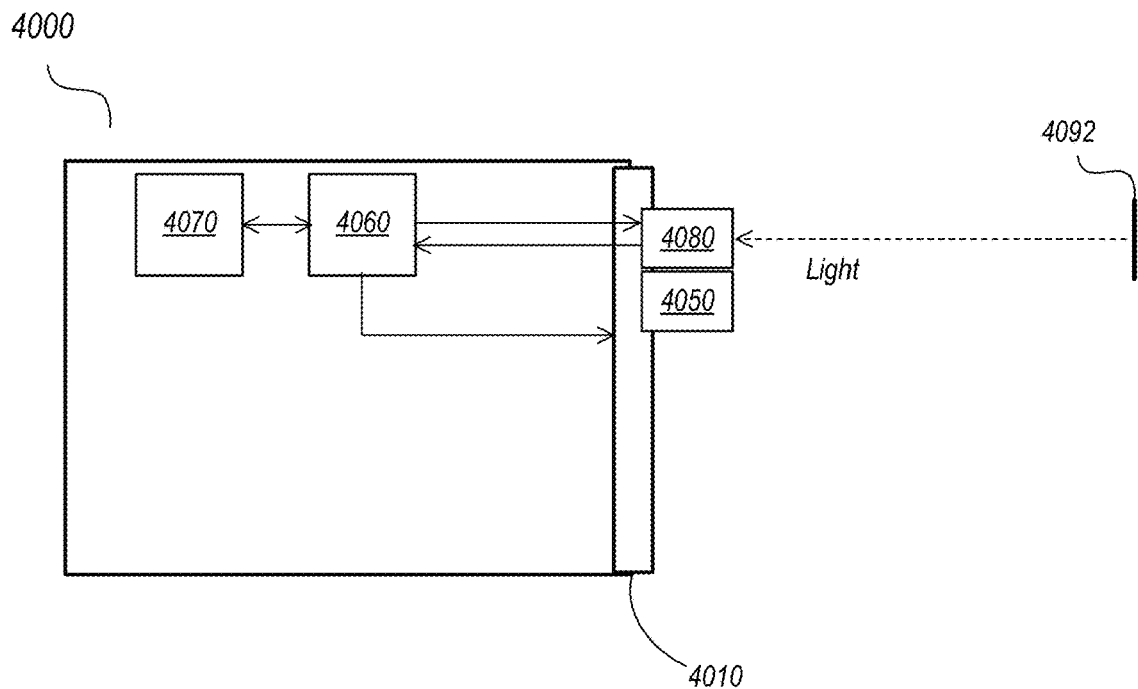
FIGS. 26A and 26B are block diagrams illustrating another device that may include or be attached to a steerable receiver, according to some embodiments.
Figure 26B:
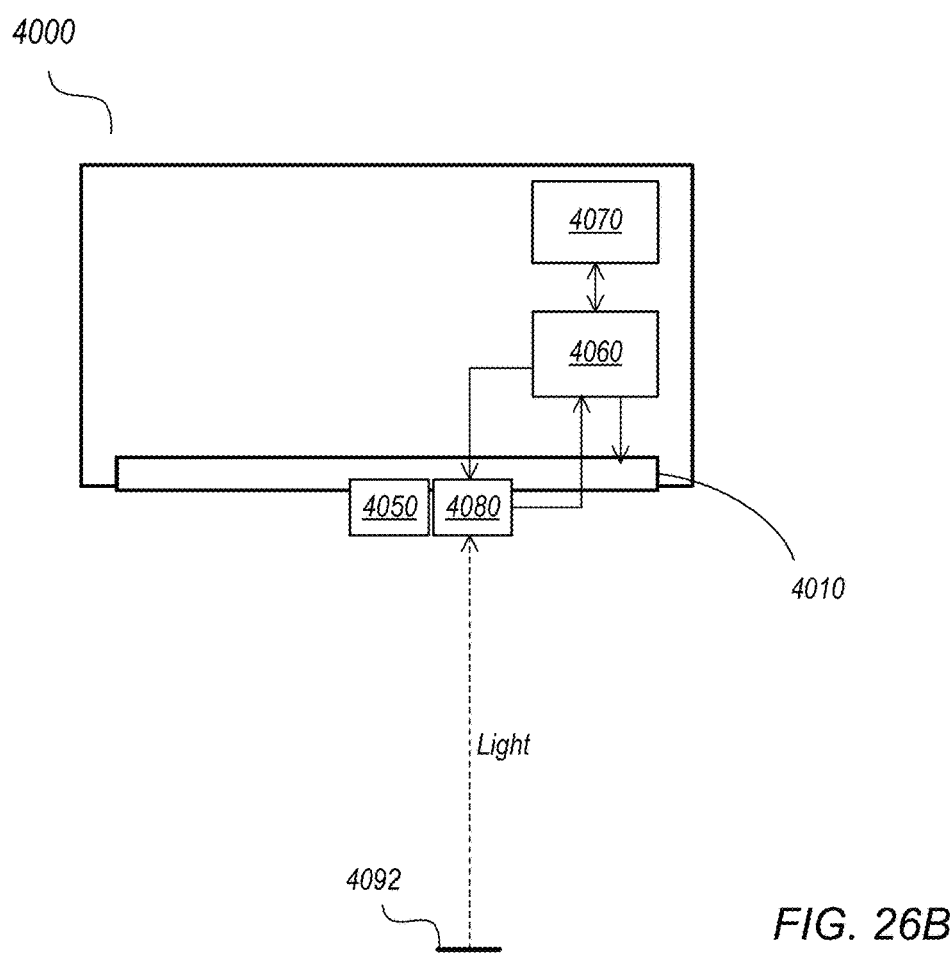

Another example application of the methods and apparatus as described herein is in computer-generated reality (CGR) systems. A CGR system may include a wearable device such as a headset, helmet, goggles, or glasses (referred to herein as a head-mounted device (HMD)). An HMD may include a display on which CGR content is displayed for viewing by the user. Embodiments of the receiver mapping methods and apparatus implemented on the HMD may be used to locate and receive information from one or more transmitters (broadcast tags) integrated in, attached to, or associated with objects or persons in an indoor environment such as a room, or in outdoor environments. The information communicated by the transmitter(s) may, for example, be used to locate, obtain, and/or render virtual content associated with the respective objects or persons. FIGS. 26A and 26B illustrate an example HMD that may include or be attached to a steerable receiver, according to some embodiments.

Transmitter and Receiver Architectures

As previously mentioned, conventional referential and algorithm models for anchoring digital content to reality have drawbacks. Embodiments of methods and apparatus are described that may provide for the direct delivery of entire content bundles from transmitters (broadcast tags) to receivers. Unidirectional, line of sight, high bandwidth broadcast tags are described, and steerable receivers are also described that can "tune in" or lock on to a transmitter (broadcast tag) to receive a content bundle. Under this model, all data may remain local between the transmitter and receiver. Since the transmitter is providing the full content bundle of baseline digital content, the broadcast content is controlled by the transmitter owner and not by another entity such as a digital platform.

In embodiments, there are two main components: transmitters (broadcast tags) and steerable receivers. In some embodiments, since the communication between a transmitter and a receiver is unidirectional, neither of these elements needs to be a transceiver. However, in some embodiments, bi-directional communications may be used, and thus at least one of these components may be a transceiver.

Figure 2:
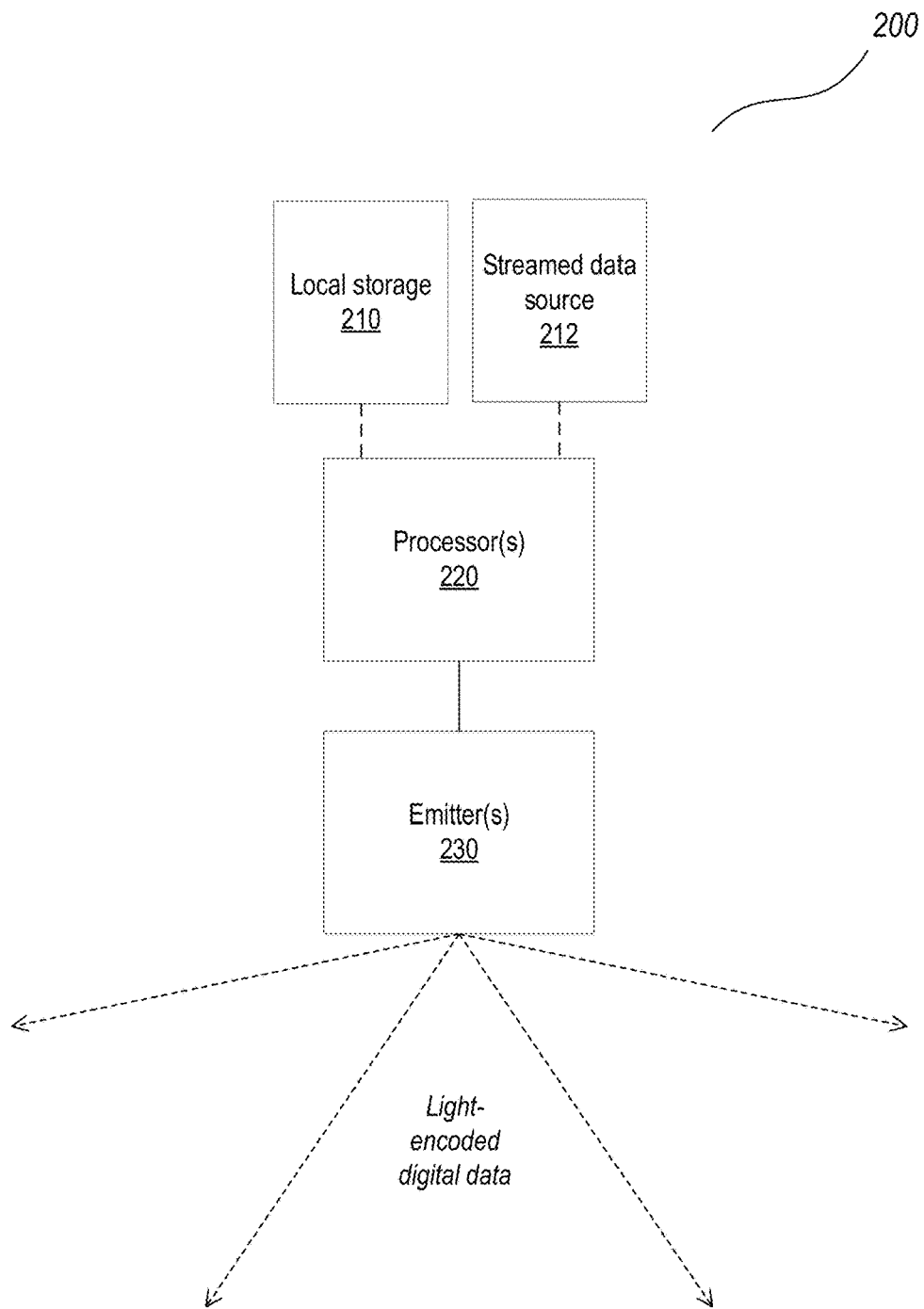
FIG. 2 is a high-level block diagram of a transmitter architecture, according to some embodiments.

FIG. 2 is a high-level block diagram of a transmitter architecture, according to some embodiments. In some embodiments, the transmitter 200 may include at least one or more processors 220, a light source (emitter(s) 230), and a data source. For example transmitter 200 may include an ASIC (application-specific integrated circuit) that drives and modulates a light source 230 of a desired wavelength (e.g., a LED (light-emitting diode) or VCSEL (vertical cavity surface emitting laser) light source) according to data that may be either streamed 212 in to the transmitter (via USB, from a host system, etc.) or read from local storage 210 (e.g., SD card, Flash, etc.), depending on the particular implementation. Modulating or pulsing the light source 230 produces a digital signal in the emitted light, and can be done at a very high rate; data rate of the digital signal may be anywhere in a range of a few (<10) megahertz (MHz) up to 100 MHz or higher, depending on the application. Embodiments may use any of various wavelengths of light within the infrared/near-infrared (IR/NIR) range, or alternatively may use wavelengths outside the IR/NIR range. In some embodiments, a simple transmitter 200 that has a single light source 230 (also referred to as an emitter) may be used. In some embodiments, with power levels increased to increase range, multiple light sources 230 may be driven in parallel. As bit-rates are increased, additional emitters 230 in other wavelength bands may be used. Beyond the main data transmission, the intensity of the light source 230 follows a slower envelope function that a camera (e.g., a CMOS camera) can sample (e.g. less than 30 Hz if the camera samples at 60 Hz). In some embodiments, when physically placed in an environments, the broadcast tag 200 is arranged with the light source 230 at or near the surface. In some embodiments, a transparent window or lens may be used to guide the emitted light into an appropriate broadcast pattern.

A broadcast tag (e.g., transmitter 200) may be a standalone tag that may, for example, be attached to or integrated in a device, object or surface in indoor or outdoor environments, attached to a person's clothing or other personal items such as a purse, or worn on a necklace or bracelet. Broadcast tags may be connected to wall power, or may be powered by batteries, solar power, piezoelectric power, or in general any power source.

Figure 3:
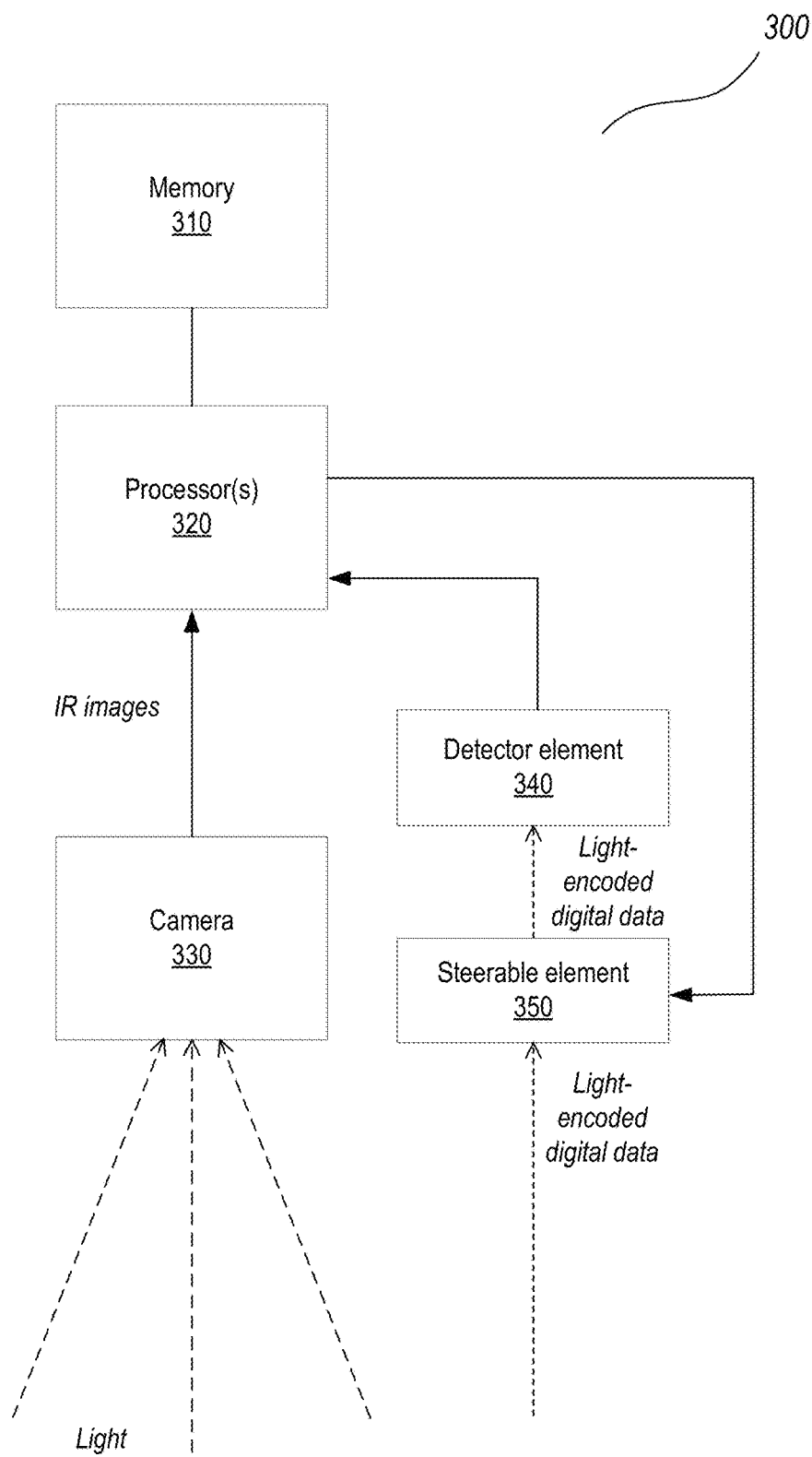
FIG. 3 is a high-level block diagram of a receiver architecture, according to some embodiments.

While not shown, in some embodiments transmitter 200 may implement wireless technology a for example via which a data source 212 may stream data to the transmitter 200. In some embodiments, a receiver, for example as illustrated in FIG. 3 may also transmit data (e.g., localization data) to a transmitter 200 via a wireless connection. In some embodiments, wireless access information may be provided to a receiver in an ID frame according to a transmitter data protocol as described later in this document.

FIG. 3 is a high-level block diagram of a receiver architecture, according to some embodiments. In some embodiments, the receiver 300 may operate in a single wavelength band (e.g. 930-950 nm). In some embodiments, the receiver 300 may include, but is not limited to, a camera 330, a photodiode detector (detector element 340), a steerable element 350, and (optional) collimating and focusing optics (not shown).

In some embodiments, the receiver 300 includes a camera 330 that is used to detect the slow envelope fluctuations of transmitters (broadcast tags) in an environment. The camera 330 may be a visible light, IR light, or broader-range camera, and may include at least a lens system and a photosensor. In some embodiments, the camera 330 may be a complementary metal-oxide-semiconductor (CMOS) camera. In some embodiments, the camera 330 does not include an IR filter; alternatively, an included IR filter can be disabled or bypassed as needed. However, a typical camera photosensor can sample a lot of pixels, it cannot typically sample pixels at a high enough rate to support the data rate provided by the modulated light of a transmitter 200. Thus, the detector element 340 includes photodiodes that are capable of sampling light at a high rate to support the data rate available from the light-based transmitters 200.

In some embodiments, the receiver 300 includes a detector element 340. In some embodiments, the detector 340 may be a multiple element, high speed photodiode. In some embodiments, a four element (2×2) array of photodiodes may be used; however, arrays with more than four photodiodes may be used in some embodiments. In some embodiments, a single photodiode may be used; however this arrangement may sacrifice a critical feedback loop for stability purposes.

In some embodiments, the receiver 300 includes a steerable element 350 that may be used to "steer" or select a portion of the light received by the camera 330 to the detector element 340. In some embodiments, the steerable element 350 may be a DMD (digital micro-mirror device). However, other steerable optics such as small gimbals may be used. The steerable element 350 is used to steer or redirect a desired slice of incoming light (e.g., the transmitting light beam from a particular broadcast tag) onto the photodiode detector 340.

In some embodiments, collimating and focusing optics (also referred to as detector optics) may be included in the receiver 300 between the steerable element 350 and the detector element 340, and/or between the camera 330 and the steerable element 350. The detector optics may, for example, be used to narrow the field of view of the detector element 340, in some embodiments down to one degree or smaller.

The receiver 300 also includes or is coupled to one or more processors 320 that, for example, process images captured by the camera 330, control the steerable element 350 to redirect a portion of the light to the photodiode detector 340, and process inputs from the photodiode detector 340. In some embodiments, the receiver 300 also includes or is coupled to memory 310 that may, for example, store program instructions executable by the one or more processors 320 to perform the processing functionalities of the receiver 300. In some embodiments, the one or more processors 320 include or implement at least a decoder and a controller. The decoder may, for example, be an FPGA. The controller may be one of any of a variety of microcontrollers.

In some embodiments, images captured by the camera 330 may be processed to detect signals from particular broadcast tags. Once a particular broadcast tag is detected, the steerable element 350 may be controlled to redirect or steer the light from the broadcast tag to the detector 340.

In some embodiments, the camera 330 may be used for gross localization of transmitters in an environment. In some embodiments, the one or more processors 320 may implement algorithms, which may include but are not limited to machine learning (ML) and/or computer vision algorithms, to locate particular transmitters (broadcast tags) in the environment. Under control of the processor(s) 320, the steerable element 350 points the detector element 340's field of view towards a particular transmitter that has been detected, or otherwise selects the light from the particular transmitter. The detector 340 captures the redirected light signal from the particular transmitter, and sends the captured signal to the processor(s) 320 for processing.

In some embodiments in which the detector 300 includes an array of multiple photodiodes, the relative signal level in at least two of the elements in the photodiode array may be used to make minor adjustments to the steering element 350 to nominally center the transmitter signal on the detector 340. Note that single element photodiode arrangements lack this feedback loop. In some embodiments, if the transmitter is too bright, the beam can be intentionally misaligned to reduce the signal level of one of the photodiode elements to be within a range. As the device including the receiver 300 moves in space, the steerable element 350 may be controlled to keep the appropriate signal locked onto the photodiode array of detector 340. In some embodiments, accelerometer and/or gyroscope data can be used to help in the control loop, if available. In some embodiments, the camera 330 may instead or also be used (e.g., by processing images captured by the camera 330) in detecting and correcting for gross motions.

It is possible to implement a system in which a camera 330 is not included. However, without the camera 330, a steerable element 350 would have to be scanned across an environment to search for broadcast tags. This unguided search may be less efficient than using a camera 330 for gross localization of broadcast tags in the environment, and may make multiplexing or identifying multiple broadcast tags in quick succession more difficult.

In some embodiments of a transmitter 200 and steerable receiver 300, to increase bitrates, multiple wavelengths may be used. To achieve this, one or more additional elements may be added to the optical system of the receiver 300. In some embodiments, an additional collimation stage may be used. In some embodiments, a dichroic optical element may be used to separate the first wavelength band from the remaining light. The first wavelength is passed through the dichroic element onto the detector element 340 as before, while the new wavelengths are reflected. In some embodiments, a refractive optical element or a diffraction grating may be used to spatially separate the new wavelengths by color. In some embodiments, an array of wavelength-specific photodiodes may be used in the detector element 340 to detect each wavelength band. This array of photodiodes may have optical filters on top to provide additional wavelength specificity.

In some embodiments, an optical phased array (OPA) may be used in place of the receiver assembly, and thus without requiring a CMOS camera. In the receiver configuration, an OPA integrates the photodiode portion with the phased array portion on a single chip.

A steerable receiver 300 may, for example be an accessory that plugs into a mobile device (e.g., a smartphone, tablet or pad device, HMD, etc.), or that communicates with a mobile device via a wireless connection. Alternatively, a steerable receiver 300 may be implemented as a module that may be integrated into mobile devices, or into other devices including but not limited to vehicles. An integrated steerable receiver 300 may leverage an existing camera 300 in the device in which it is integrated; in this case, the module includes the high data rate steerable element 350 and detector element 340.

Steerable Element Implementations

There are several methods in which a steerable element may be implemented to steer or select a light beam from a particular broadcast key that may be used in embodiments of a steerable receiver. These methods include, but are not limited to, a liquid crystal (LC) photodiode detector, a digital micro-device (DMD) photodiode detector, and a high-speed photosensor with selectable pixels that integrates the "steerable" component with a camera.

Figure 4:
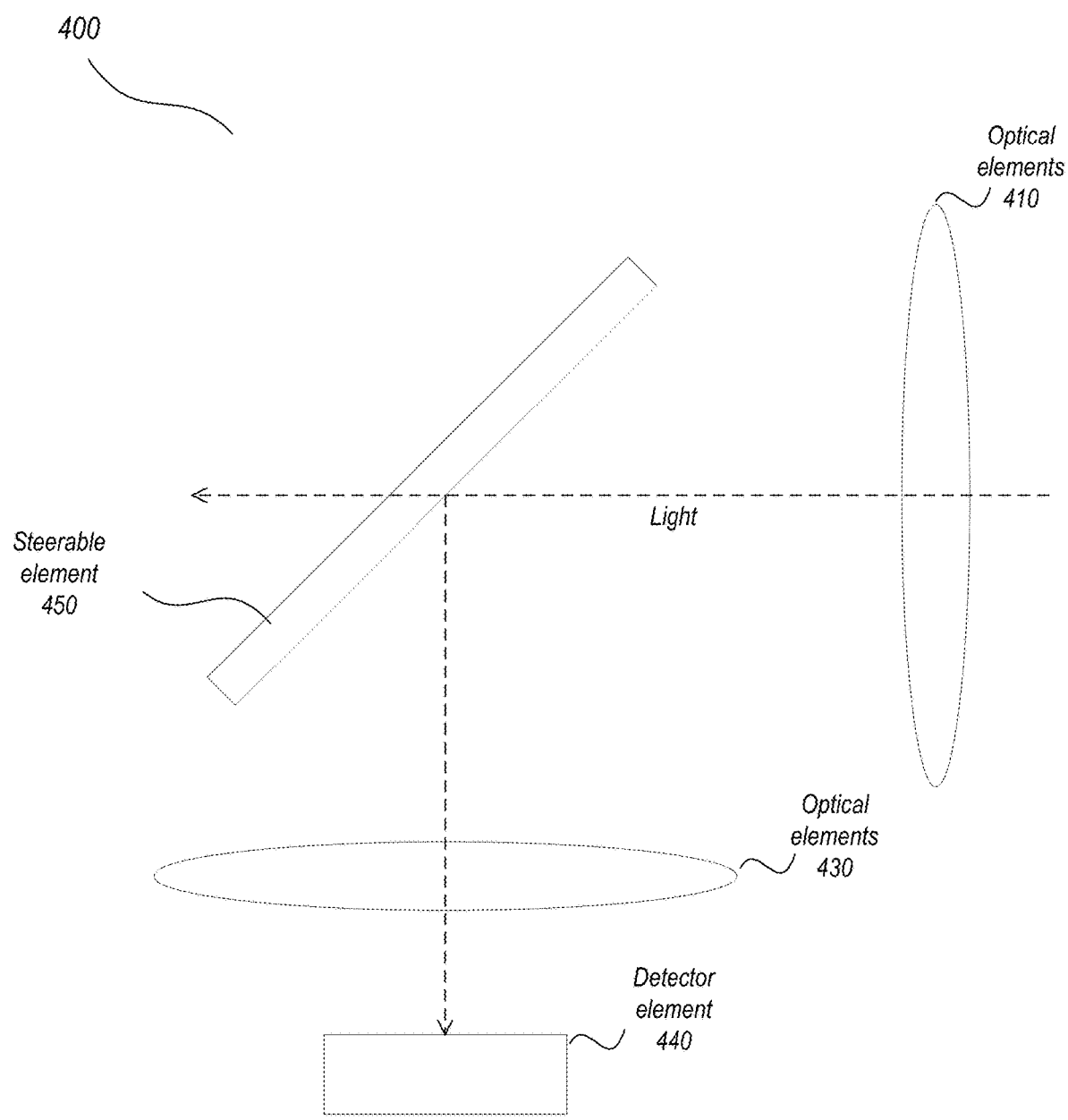
FIG. 4 graphically illustrates a single wavelength receiver architecture, according to some embodiments.

FIG. 4 graphically illustrates a single wavelength receiver architecture 400, according to some embodiments. Light from an environment, which may include light from one or more broadcast tags, may be focused (and optionally collimated) by optical elements 410. The light from optical elements 410 may be received at a steering element 450, which may be located on an optical axis of a camera. In some embodiments, at least a portion of the light passes through the steering element 450 to a camera sensor. A relevant portion of the light from a detected broadcast tag is redirected by the steering element 450 on a path orthogonal to an optical axis of the camera to optical elements 430. Optical elements 430 may focus (and optionally collimate) the received light onto a detector element 440 that may, for example, contain one or more photodiodes.

Figure 5:
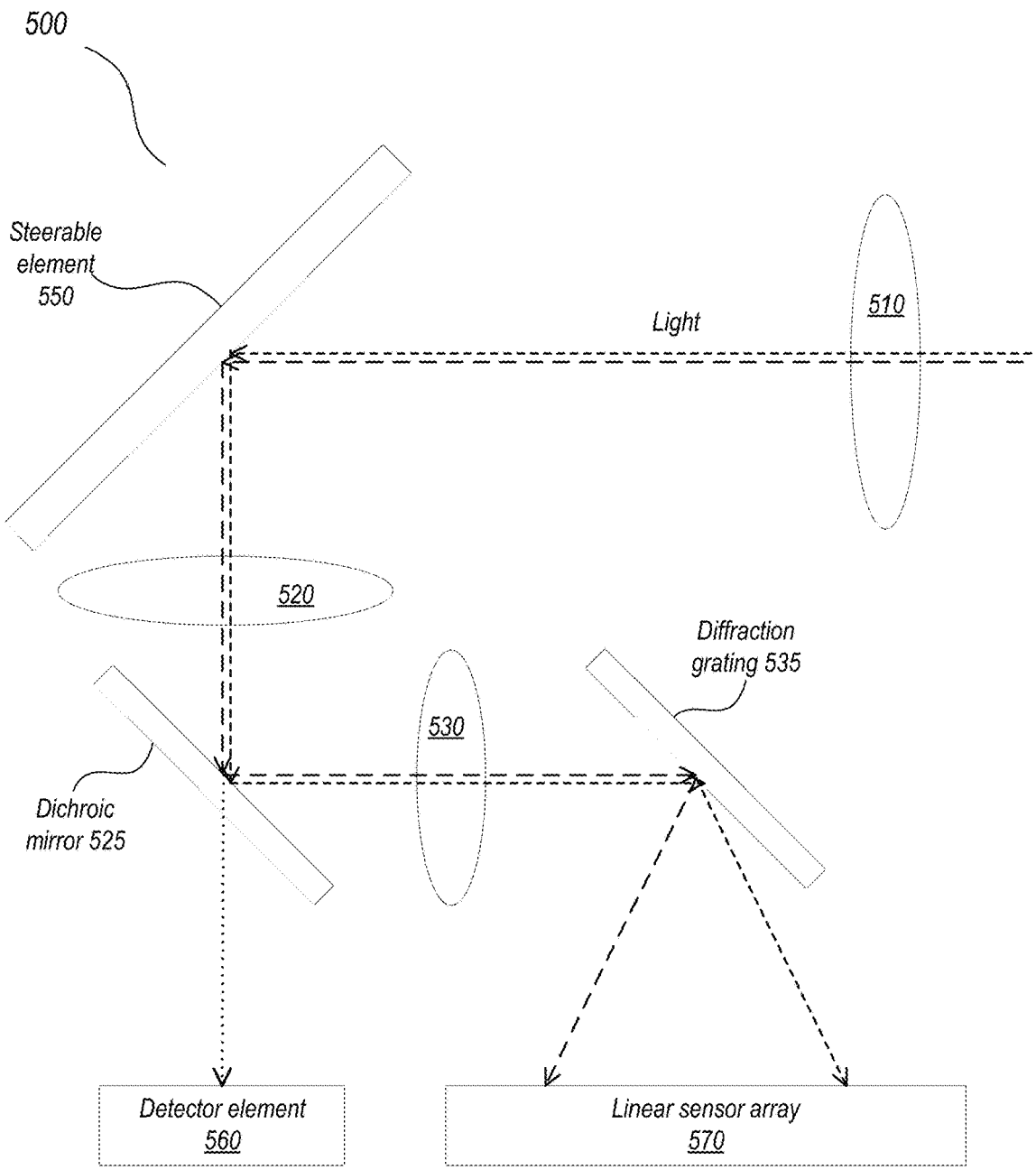
FIG. 5 graphically illustrates a multiple wavelength receiver architecture, according to some embodiments.

FIG. 5 graphically illustrates a multiple wavelength receiver architecture, according to some embodiments. Light from an environment, which may include light from one or more broadcast tags, may be affected by optical elements 510. The light from optical elements 510 may be received at a steering element 550. Steering element 550 redirects the light to optical elements 520, which affect the light before the light strikes a dichroic mirror 525. A relevant portion of the light from a detected broadcast tag passes through dichroic mirror 525 and strikes detector element 560 that may, for example, contain one or more photodiodes. At least a portion of the light is redirected by the dichroic mirror 525 to optical elements 530. Optical elements 530 may affect the received light before it strikes a diffraction grating 535. Diffraction grating 535 redirects at least a portion of the light to a linear sensor array 570.

Figure 6:
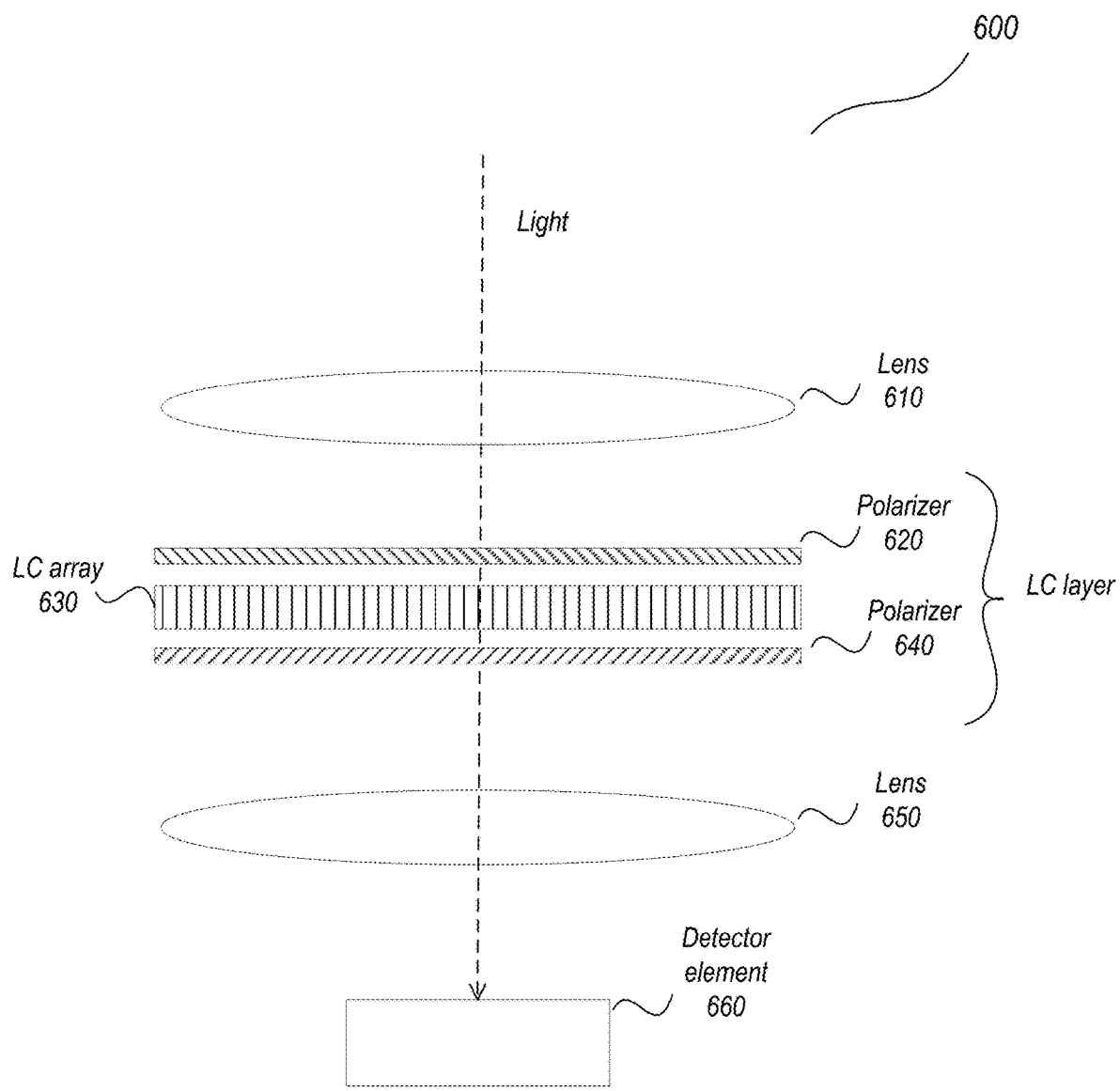
FIG. 6 graphically illustrates a LC photodiode detector, according to some embodiments.

FIG. 6 graphically illustrates a liquid crystal (LC) photodiode detector 600, according to some embodiments. The LC photodiode detector 600 architecture resembles a conventional camera, and includes, from the transmit (incoming light) side to the detection side, a front lens 610 or lens stack with focusing capability and a polarizer-liquid crystal-polarizer layer (referred to as the LC layer) where a typical camera sensor would be that includes a first polarizer 620, an LC array 630, and a second polarizer 640. The LC array 630 may utilize one or more technologies that LCDs use (e.g., IPS, PLS, etc.) to maximize light throughput. Behind the LC layer is another lens 650 or lens stack to focus the light that passes through the LC layer onto a single, sensitive, fast response detector element 660 that includes one or more photodiodes. The size of each 'pixel' in the LC array 630 determines the effective beam width. In this embodiment, multiple photodiodes are not used for high frequency control of the beam direction. Instead, in some embodiments, adjacent LC array 630 pixels may be turned partially on to see if this improves the signal-to-noise ratio (SNR) at the detector element 660. If it does, the center of the 'on' LC array 630 pixels migrate in that direction. Additionally, in some embodiments, if the photodiode is saturated, the LC array 630 pixels may be dimmed until the signal is within range. Note that, in this implementation, there is a baseline rejection of ~50% of incident light, and polarized light sources cannot be used on the transmit side.

Figure 7:
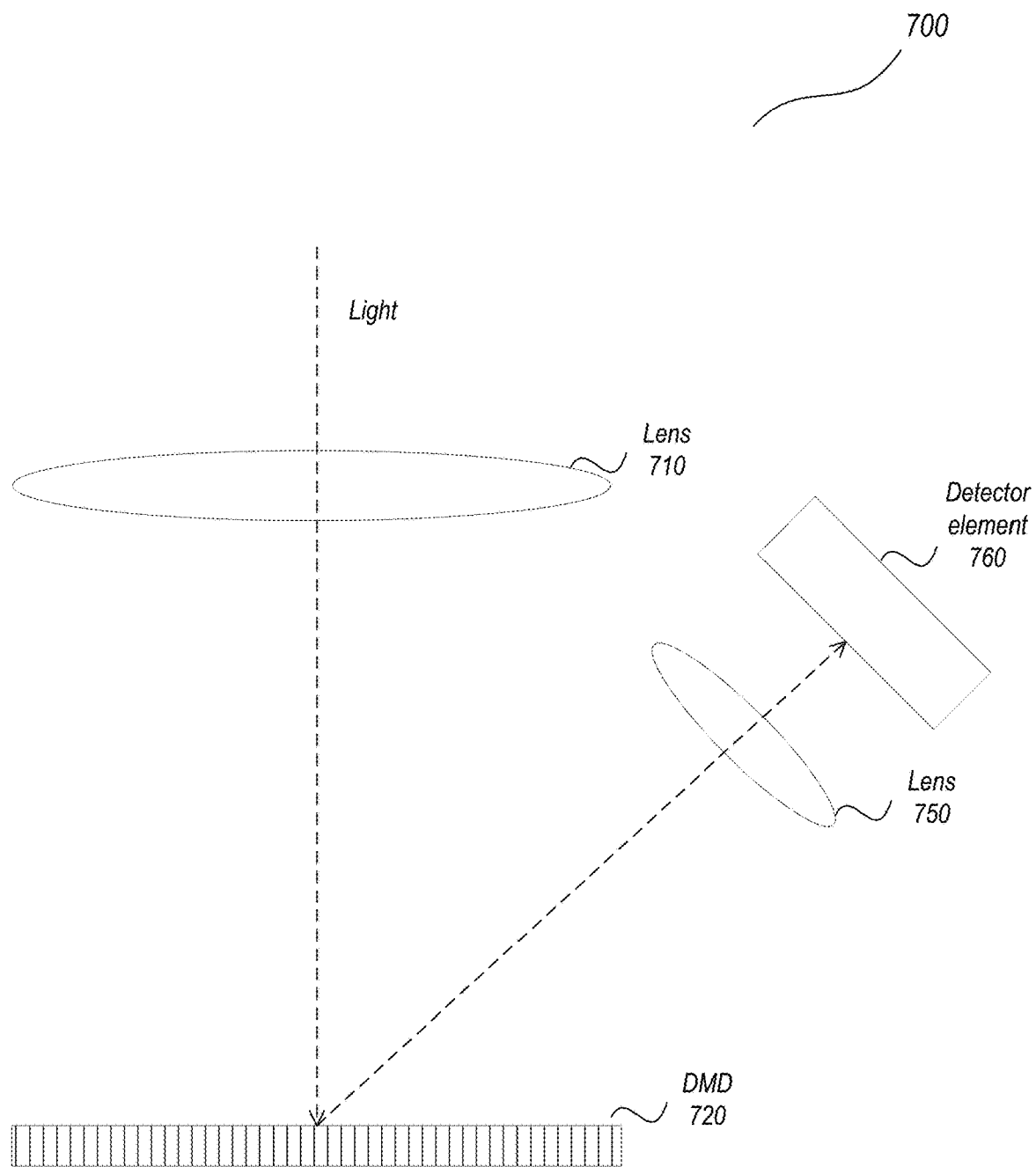
FIG. 7 graphically illustrates a DMD photodiode detector, according to some embodiments.

FIG. 7 graphically illustrates a DMD photodiode detector 700, according to some embodiments. The DMD photodiode detector 700 architecture resembles a projector operated in reverse. A first lens 710 or lens stack focuses an image onto a DMD 720 that includes an array of reflective elements, referred to as micro-mirrors, which can be individually controlled to steer or redirect light. Each micro-mirror may be considered an individual 'pixel'. Appropriate micro-mirror(s) of the DMD 720 may be activated to direct a portion of the light to a second lens 730 or lens stack, which collimates and/or focuses the light onto a detector element 740 comprising one or more photodiodes. In some embodiments, high-speed beam control may be provided by turning on adjacent micro-mirrors. The DMD photodiode detector 700 architecture allows polarized transmitters and accepts all incident light. However, dimming the light source requires sampling adjacent pixels.

Figure 8:
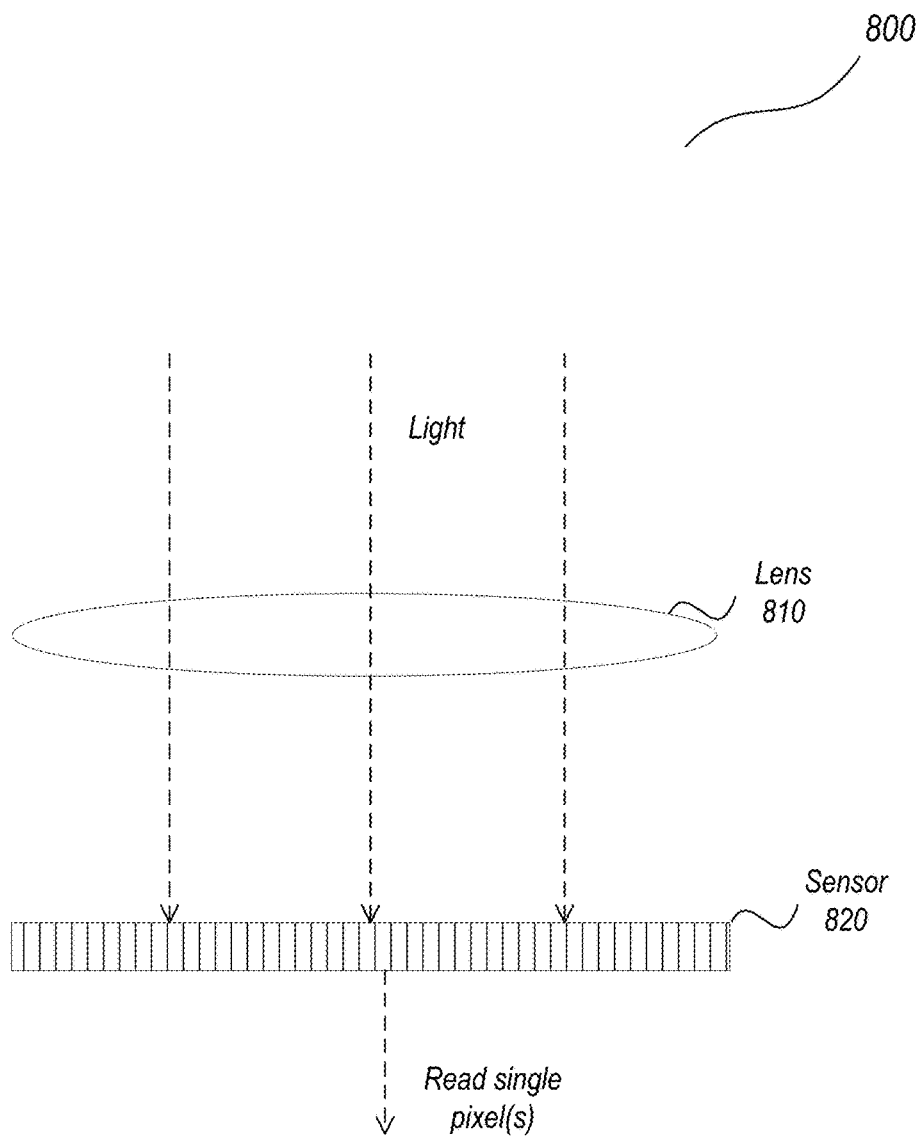
FIG. 8 graphically illustrates a high-speed photosensor with selectable pixels that integrates the "steerable" component with a camera, according to some embodiments.

FIG. 8 graphically illustrates a high-speed photosensor with selectable pixels that integrates the "steerable" component with a camera, according to some embodiments. This embodiments is essentially a camera 800 that includes a lens 810 or lens stack and a high-speed photosensor 820 on which individual pixels may be selected. Rather than using a steerable element to create a directional receivers, these embodiments may employ a camera 800 that includes a photosensor 820 with high-speed selectable pixels on which individual pixels can be selected to obtain or "tune into" a signal from a transmitter. These embodiments may be more scalable than the other methods described herein. In these embodiments, camera pixel arrays (photosensors 820) may be leveraged; instead of scanning rows and columns and integrating their outputs, embodiments may "lock on" to the output of only a single pixel at a time so that the data can be read from that pixel in real time. In some embodiments, the same sensor 820 may be used to track and locate the data targets (transmitters) to lock onto. However, in some embodiments, a separate camera sensor may be used in conjunction with sensor 820 to track and locate the data targets (transmitters) to lock onto. In some embodiments, a single hybrid sensor 820 may be used, a portion of which uses the high speed lock on sensor/circuitry, while the rest of the sensor 820 is used to which integrate and scan for targets, allowing for both tracking and data capture in a single package.

Figure 9A:
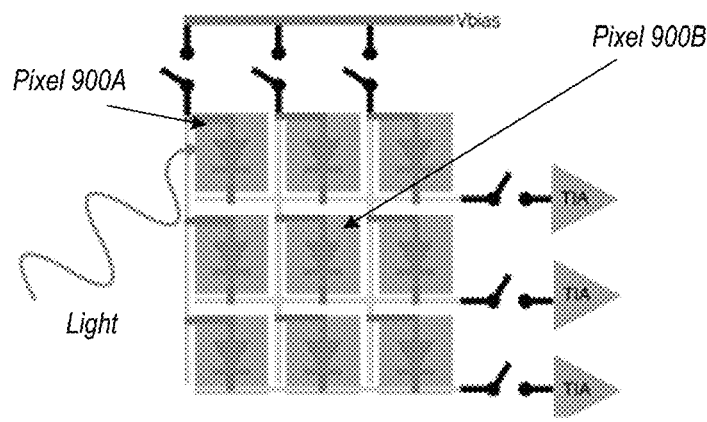
FIGS. 9A through 9D graphically illustrate locking on to single pixels on a sensor, according to some embodiments.
Figure 9B:
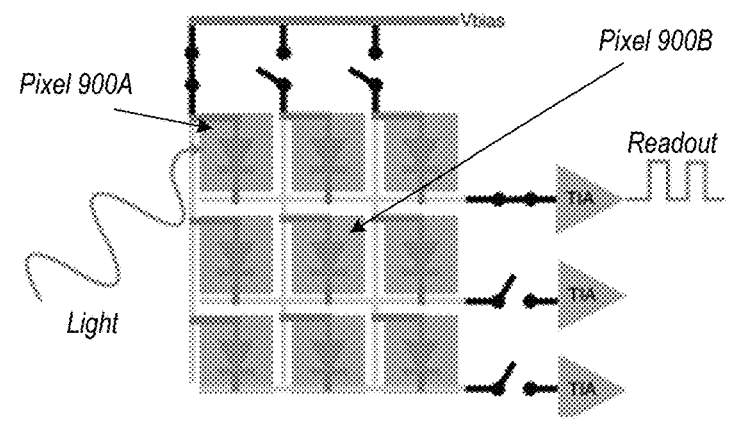
Figure 9C:
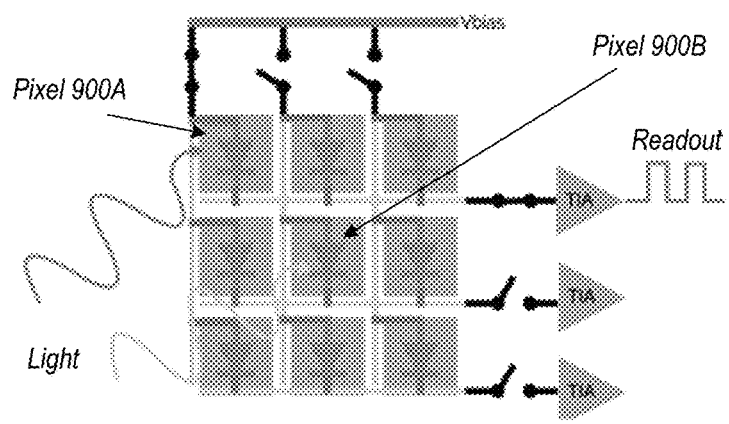
Figure 9D:
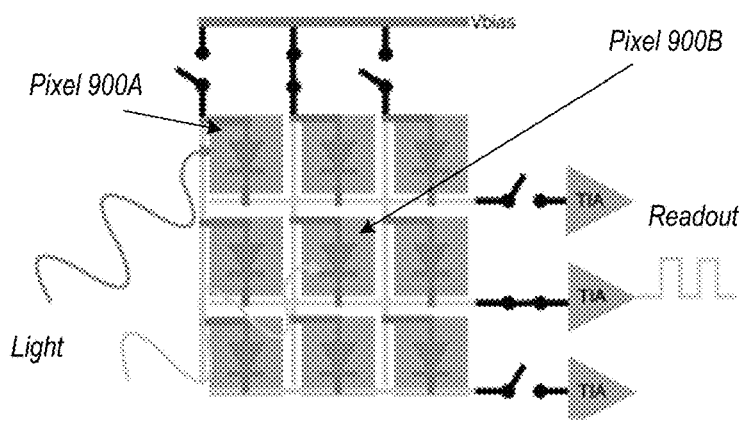

FIGS. 9A through 9D graphically illustrate locking on to single pixels on a sensor 820, according to some embodiments. In FIG. 9A, light is received and processed, and a target pixel 900A is determined accordingly. In FIG. 9B, Vbias and TIA circuitry are activated to readout data from pixel 900A. In FIG. 9C, additional light is received and processed, and a target pixel 900B is determined accordingly. In FIG. 9D, Vbias and TIA circuitry are deactivated for pixel 900A and activated to readout data from pixel 900B.

Transmitter Data Protocol

Embodiments of the methods and apparatus for providing reality-anchored digital content may implement a flexible and scalable transmitter data protocol. In some embodiments, there are two different types of frames that are transmitted: identifier (ID) frames and data frames. In some embodiments, a first band selected (e.g. 930-950 nm) with an initial encoding and bit rate (e.g. 8b/10b OOK @ 100 Mbps) may be used for the broadcast of transmitter ID frames regardless of how the rest of the data is encoded and transmitted. The ID frame may include information including one or more of, but not limited to, the transmitter unique ID, timestamp, data type, data encoding scheme, data bit rate, and digital signature. ID frames may be broadcast multiple times per second, and transmitters may have no more than a specified gap between the ID frames. This allows all receivers to identify transmitters and surface them to the observer even if they cannot get the full extent of the data. This enables the observer to understand that there may be more content available, but they are unable to access the content because their receiver is not capable of handling the data. There are a variety of available digital signature schemes (e.g. PGP) with varying trade-offs which may be used in embodiments. In some embodiments, an ID frame (or, alternatively, a data frame) may also include location (e.g., GPS) and/or orientation (angle and distance) information for the transmitter which may be used, for example, in locating and orienting digital content provided in the data frame(s) in one or more AR views of the environment.

Data frames may be specific to what data type is being broadcast. In some embodiments, at a high level, data frames may have a start indicator, data ID (e.g. block 4 of 8), payload, and cyclic redundancy code (CRC). This layer may be as generic as possible. Unlike the ID frames, different types of encodings and bit rates may be used. Given the unidirectional broadcast nature of the link between a transmitter and a receiver, the manner in which data is packaged and shipped out is important.

In some embodiments, the data frame(s) may convey pre-rendered content, or alternatively all of the information that is needed to render a 2D or 3D virtual object for display on an observer's device. However, in some embodiments, only partial rendering information may be provided, and the rest of the information may be obtained locally or remotely (e.g., from the cloud) and/or derived from sensor data on the receiver. In some embodiments, a data frame may include only a reference or references to where data may be obtained, or reference(s) along with at least some rendering information.

Transmitting Directional Optical Data Containing Transmitter Angular Coordinates for Rendering Virtual Content Methods and apparatus for conveying directionality and distance information from a transmitter (e.g., a broadcast tag) to a receiver (e.g., a steerable receiver) within the coordinate system of the transmitter are described. Conveying the directionality and distance information to the receiver may, for example, reduce augmented reality (AR)/computer vision (CV) computational loads at the receiver. These methods and apparatus may, for example be implemented in systems for providing reality-anchored digital content in an environment as described in reference to FIGS. 1A through 9D.

An optical source (e.g., a broadcast tag) inherently has a light distribution which it emits. This distribution is some function of observation angle (theta (θ) and phi (φ)), in which the wavelength, intensity, polarization, and modulation vary. Generally, observation angle only affects intensity, and in some cases slight changes to wavelength and polarization, with all of these features generally being symmetric around some axes. A key insight is that if an optical transmitter can be created with one of these features having a 1:1 correspondence with each unique observation angle, a prior knowledge of this mapping allows the observer to reconstruct this viewing angle in terms of the coordinate system of the optical transmitter alongside potentially its distance from the transmitter, which may allow for reduced computation in AR rendering. The observer/receiver may, for example, be a simple single photo diode, a camera system, or a steerable receiver as described herein.

The directionality and distance information provided by the transmitter may, for example, reduce computational time and power cost on a receiving device that renders AR content in 3D space corresponding to an object, person, or surface associated with the transmitter. Conventionally, an AR device would first need to identify the object, person, or surface for which the AR content is to be rendered, then estimate its distance using, for example, a computationally intense algorithm or 3D sensing device, then estimate its observation angle (for example, via algorithms or machine learning), and then generate a 2D projection of the 3D content at the observation angle to overlay at or over the object, person, or surface. Embodiments of a transmitter that provides directionality and distance information as described herein may aid in one or more of these stages of the rendering process on the receiving device.

A mathematical framework for these methods is discussed. Different schemes for modulating the 1:1 correspondence are described, and methods for recovering or estimating distance information are also described. In addition, transmitter architectures to support these methods are described.

Mathematical Framework:

Any X,Y,Z relationship between two objects can be defined as a vector between the objects which contains both direction and magnitude (distance). Calculating these two variables is the task of all localization and 3D mapping technologies. This may, for example, be accomplished using triangulation. For example, stereo cameras (as well as motion capture systems) work on this premise. Given two cameras with a known vector between them, a point in their view frames can be observed. That point creates a corresponding angle for each frame, which generates a ray. The point where these two rays meet is the point of observation in 3D coordinates. This is effectively a triangle formed by two observation vectors and the vector between the cameras, creating a solvable system of equations to back out the exact vector of the object.

A broadcast tag that transmits this vector to the receiver may remove the need to compute the above information at the receiver, and removes the need for two cameras, which may, for example, allow the use of only a single photodiode at the receiver. Two objects with a pair of transmitters and receivers may also be able to correspond their coordinate systems (location and orientation). This may require the broadcast tag to relay directional information based on the direction of observation with a 1:1 correspondence, along-side the distance to the receiving object. Methods and apparatus by which this can be achieved are described below.

Optical Implementations

In implementations where the wavelength or polarization of light being emitted by the transmitter is observation angle dependent with a 1:1 correspondence, an observer/receiver can recalculate its observation angle in terms of the world coordinates of the transmitter.

If the observer/receiver is a camera, this may be accomplished using a hyper-spectral system or and RGB array. Because the camera inherently calculates observation angle of the transmitter in its world coordinates (by nature of re-projection of the image onto the sensor array), this allows for the capture of a correspondence between the transmitter coordinate angle and the receiver coordinate angle. Because the size of the optical transmitter observed by the camera is dependent on the distance of the observation, distance can also be estimated. A combination of distance and angle is all that is needed to generate a vector between the observer/receiver and the transmitter (the vector is the dot product of direction and magnitude).

If the observer/receiver is a single or a limited number of photodiodes, similar localization data can be calculated. If the receiver can measure the wavelength or polarization of the light, the direction to the transmitter is encoded. Because the transmitter's intensity falls off based on the inverse square $$\left(\frac{1}{r^2}\right),$$

if the initial r=0 intensity is known or encoded in the signal for comparison, the distance from the transmitter to the receiver can be recovered/estimated.

In embodiments of the steerable receiver described herein, one or both of the above methods may be used to obtain localization data for transmitters and receivers. In addition, in some embodiments, data rates may be high enough to push AR assets (virtual content) from the transmitter in the light-encoded data stream to be rendered on the receiver in terms of observation angle and distance, which may simplify or eliminate one or more stages of the receiver-side AR rendering process. However, at least 3D to 2D projection would need to be performed at the receiver.

Optical Implementations with Modulation

In implementations where the modulation of data is dependent on observation angle (e.g., via amplitude) with a 1:1 correspondence, an observer/receiver can recalculate its observation angle in terms of the world coordinates of the transmitter. This modulation may be in the frequency domain, or alternatively the modulation itself could carry the information (for example directly transmitting bits that encode angles). In either case the amount of data observable is dependent on the speed of the receiver. The receiver may implement a high-speed detector element that includes one or more photodiodes as described herein.

In embodiments where each angle of observation is transmitting differing data packets, angle information may be included in the data transmitted to the receiver(s). In addition, in some embodiments, the transmitted signal(s) may carry angle-dependent content, pre-rendered to the angle expected by particular observers/receivers. Sending angle-dependent, pre-rendered content from a transmitter to the receiver(s) may simplify or eliminate the receiver-side AR rendering process.

For example, two observers, each with a receiver, may view an AR cube or box in an environment. One observer views the box from above, and the other observer views the box from one of its side. Each observer/receiver may receive a pre-rendered box image at the correct angle of observation from the transmitter, and because the transmitter is identified in the scene and localized in distance, the pre-rendered AR box may be shown to each observer displayed in the correct position, at the correct size, and at the correct angle, with minimal computation necessary at the receivers. This reduces the computation needed for the observers' receiver-enabled devices (e.g., smartphones, HMDs, etc.) to take a 3D virtual asset and project it down to an observation angle to be rendered on top of the transmitter.

In addition, in some embodiments, observation angle-specific content can be transmitted by a transmitter arbitrarily or selectively, which may, for example, allow for applications such as providing private content from transmitters. For example, an AR experience can be provided by a transmitter in a room only if observed by a receiver within the room, and not provided if observed by a receiver outside the room, for example through a window from outside the room. As another example, transmitting observation angle-specific content may allow for the delivery of user-specific content from a transmitter (e.g., AR content that contains a person's name or preferences) to particular receivers that are determined to be authorized to receive and view the content.

Figure 10A:
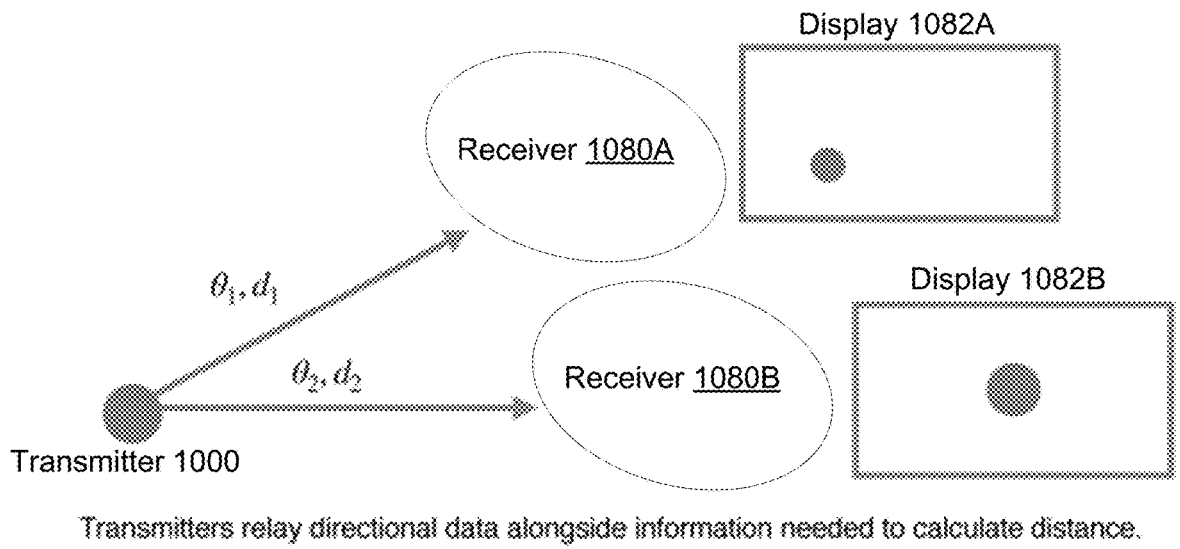
FIGS. 10A and 10B illustrate rendering digital content on the receiver based at least in part on localization information received from the transmitter, according to some embodiments.
Figure 10B:
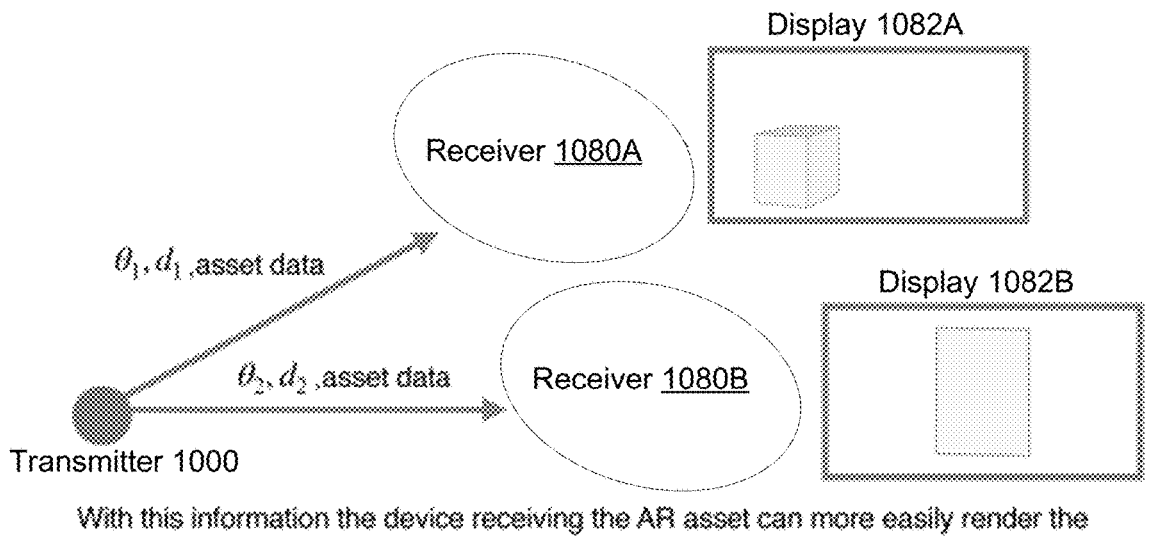

FIGS. 10A and 10B illustrate rendering digital content on the receiver based at least in part on localization information received from the transmitter, according to some embodiments. In FIG. 10A, a transmitter 1000 (e.g., a light-emitting broadcast tag) provides directional data ($\theta_1$ and $\theta_2$) and distance data ($d_1$ and $d_2$) to one or more receivers 1080 (two receivers 1080A and 1080B, in this example) via its emitted light. Encoded data in the light stream may include data needed to render a given AR asset (e.g., a virtual object such as a 3D box). The receiver(s) 1080 may then know or estimate the location (direction/angle and distance) of the transmitter 1000 based on the respective light streams received. In FIG. 10B, the receivers 1080A and 1080B may each render the AR asset according to the specific direction and distance information estimated from the respective light streams from the transmitter 1000. Thus, the observers associated with receivers 1080A and 1080B may view the AR asset appropriately rendered according to their respective position and distance from the transmitter 1000.

Figure 11A:
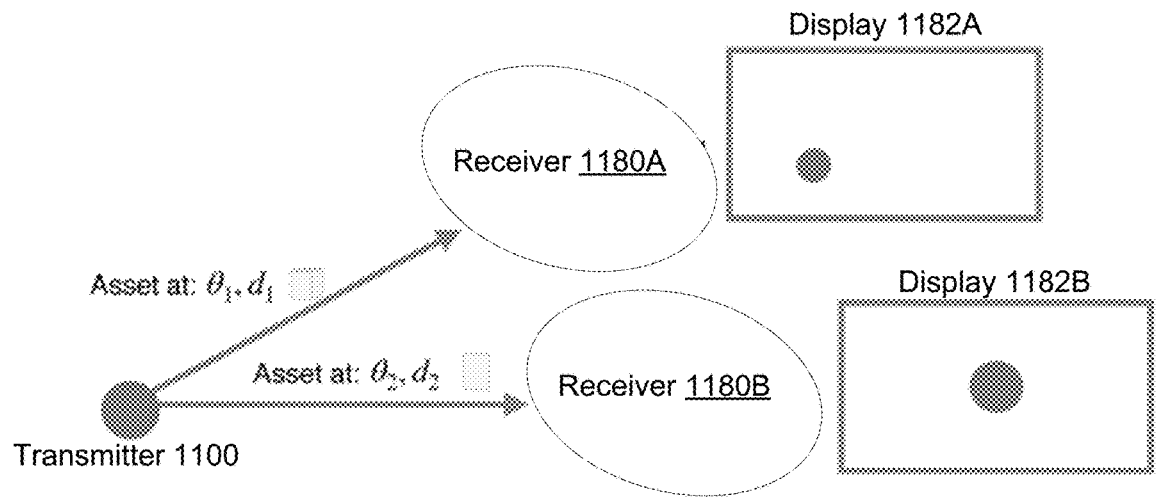
FIGS. 11A and 11B illustrate delivering at least partially pre-rendered digital content from the transmitter to the receiver, according to some embodiments.
Figure 11B:
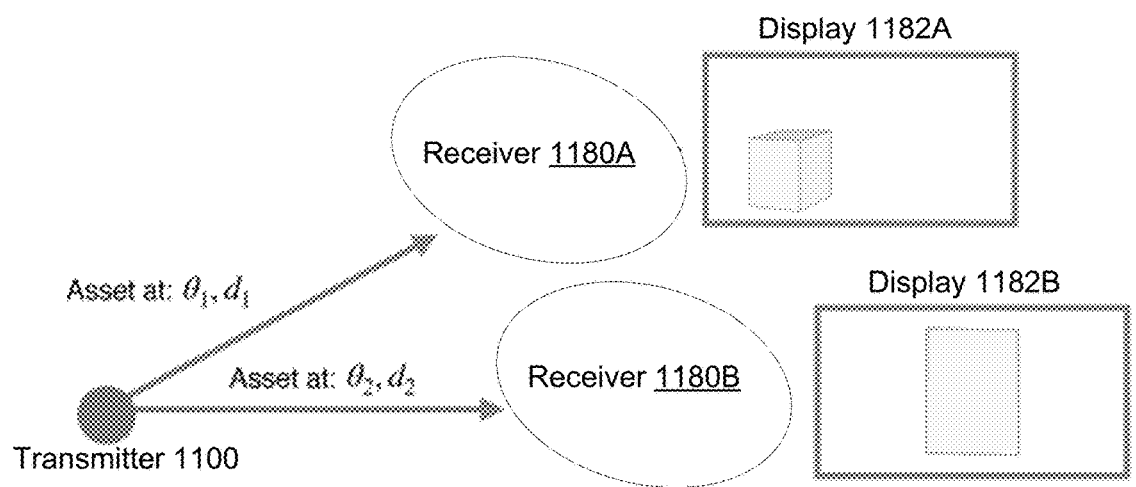

FIGS. 11A and 11B illustrate delivering at least partially pre-rendered digital content from the transmitter to the receiver, according to some embodiments. In FIG. 11A, a transmitter 1100 (e.g., a light-emitting broadcast tag) provides directional data ($\theta_1$ and $\theta_2$) and distance data ($d_1$ and $d_2$) to one or more receivers 1180 (two receivers 1180A and 1180B, in this example) via its emitted light. Encoded data in the light stream may include a pre-rendered AR asset (e.g., a virtual object such as a 3D box) based at least in part on the respective directions to the receivers 1180. The receiver(s) 1180 may then know or estimate the location (direction/angle and distance) of the transmitter 1100 based on the respective light streams received. In FIG. 11B, the receivers 1180A and 1180B may each perform minimal processing of the pre-rendered AR asset included in their respective light streams according to the distance information estimated from the encoded data provided by the transmitter 1100. Thus, the observers associated with receivers 1180A and 1180B may view the AR asset appropriately rendered according to their respective position and distance from the transmitter 1100, with minimized rendering required on the receivers 1180.

Leveraging Transmitter Angular Coordinates for Localization and Sensing

Embodiments of methods and apparatus for conveying directionality and distance information from a transmitter device to a receiver device are described. In embodiments, the receiver may receive, process and re-convey directionality and distance information to the transmitting device. The directionality and distance information may be used by the transmitter and receivers for various purposes, for example in localization, heat mapping traffic, user interfaces, and data acquisition for directed advertiser content. An insight is that if a transmitter has a 1:1 correspondence with each unique observation angle, a prior knowledge of this mapping may allow an observer/receiver to reconstruct the viewing angle in terms of the coordinate system of the transmitter, and potentially the distance to the transmitter. The transmitter can then return this information to the receiver, for example via a wireless connection (e.g., Bluetooth®, WIFI, etc.).

The shared distance and angle information may be used in producing useful localization data for a variety of applications. This method essentially flips the paradigm of localization, which conventionally requires fixed camera coordinates which observe tags to be localized. In embodiments, the broadcast tags may act as a fixed coordinate system, and the receivers (e.g., cameras, steerable receivers, etc.) localize themselves based on the broadcast tag data, which can then be fed back to the broadcast tag host device. In some embodiments, this localization may be accomplished with a single broadcast tag and a single receiver, which has conventionally not been done due to the constraints of stereoscopic triangulation. Various capabilities that may be provided by embodiments of this broadcast tag-based localization method are discussed below.

Once this information is acquired, the receiving device may feed this information back to the transmitting device, which makes both parties aware of the receiver's location. This information may, for example, be used by the transmitting party (e.g., an owner of the broadcast tag(s)) to monitor things such as foot traffic in a store or other facility in an anonymized fashion, as the receiver has the opportunity to convey or not convey their identity based on the particular implementation or preferences. This allows an opt-in system for owners of the receiver devices, unlike a surveillance camera system in which people cannot determine their opt-in preference.

In some embodiments, the transmit side (the owner of the broadcast tag(s)) may add a camera to overlay 3D information to corresponding images. For example, an image of a person carrying a receiver-enabled device may be correlated with their position as determined by the tag-based localization information provided by the transmitter-receiver communications.

Another example application for the tag-based localization information is in targeted advertisement based on a user's determined location, with or without anonymity.

As another example, tag-based localization may be useful for input devices, removing the need for cameras as the receiver may be implemented with something as simple as a single photodiode, or by an embodiment of steerable receiver as described herein. For example an AR/VR headset (e.g., a HMD) may want to track a controller device in 3D space within line of sight. Conventionally, this tracking requires a camera integrated in or mounted to the headset, and computer vision or other algorithms to identify the controller with or without an identifying tag on the controller. The camera and headset may be capable of doing this; however, this provides an additional path for invasive data capture, and may allow bad actors to capture the data. A transmitter and receiver architecture as described herein may remove the need for a camera on the headset in localization, thus reducing or eliminating these potential problems. In addition, the transmit side adds a unidirectional data transmit pathway. Note that the receiver or transmitter may be located on either side (on the headset or on the controller). This example application may be extended to any type of "paired" devices or objects.

Figure 12A:
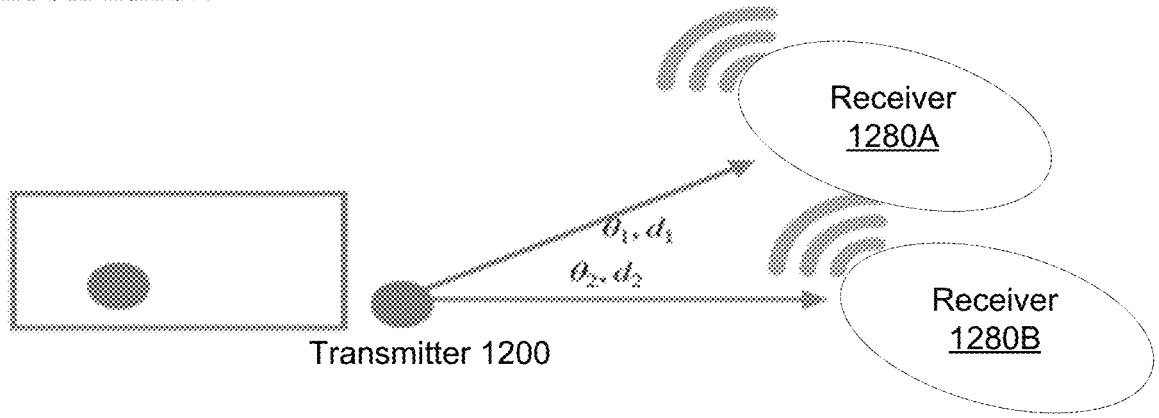
Figure 12B:
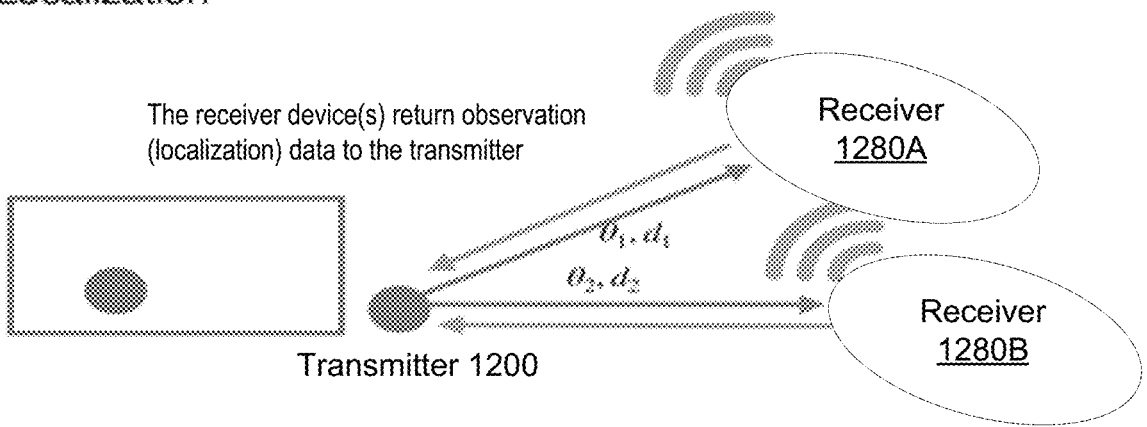

FIGS. 12A through 12D illustrate returning observation data from a receiver to a transmitter for localization, according to some embodiments. In FIG. 12A, a transmitter 1200 (e.g., a light-emitting broadcast tag) provides directional data ($\theta_1$ and $\theta_2$) and distance data ($d_1$ and $d_2$) to one or more receivers 1280 (two receivers 1280A and 1280B, in this example) via its emitted light. Encoded data in the light stream may include data for rendering an AR asset, or alternatively a pre-rendered AR asset. The receiver(s) 1280 may then know or estimate the location (direction/angle and distance) of the transmitter 1200 based on the respective light streams received. In FIG. 12B, the receiver(s) 1280 may return their observations (localization) data to the transmitter 1200, for example via wireless communications (e.g., Bluetooth®, WIFI, etc.). In FIG. 12C, the transmitter 1200 can now map the distance and observation angle of the receiver(s) 1280. In FIG. 12D, the transmitter 1200 and receiver(s) 1280 now know their relative locations. If the transmitter 1200 knows its absolute location and orientation in the environment, both the transmitter 1200 and receiver(s) 1280 can know their absolute location and orientation if that information is transmitted by the transmitter 1200 to the receiver(s) 1280.

While embodiments of transmitters and receivers are generally described herein as working in light (optical) wavelengths (e.g., IR/NIR light), embodiments may also be implemented that work in other wavelengths including but not limited to radio wavelengths. In addition, embodiments may be implemented that use acoustic (sound) in transmitter-to-receiver directional communications. However, note that embodiments of transmitters and receivers that work in optical wavelengths may provide significant advantages over other implementations. In the optical domain, a combination of various features of optical wavelengths may be used in conjunction (amplitude, polarization, wavelength, modulation, etc.) to produce the desired results as described herein.

Directional Transmitter Embodiments

Figure 13:
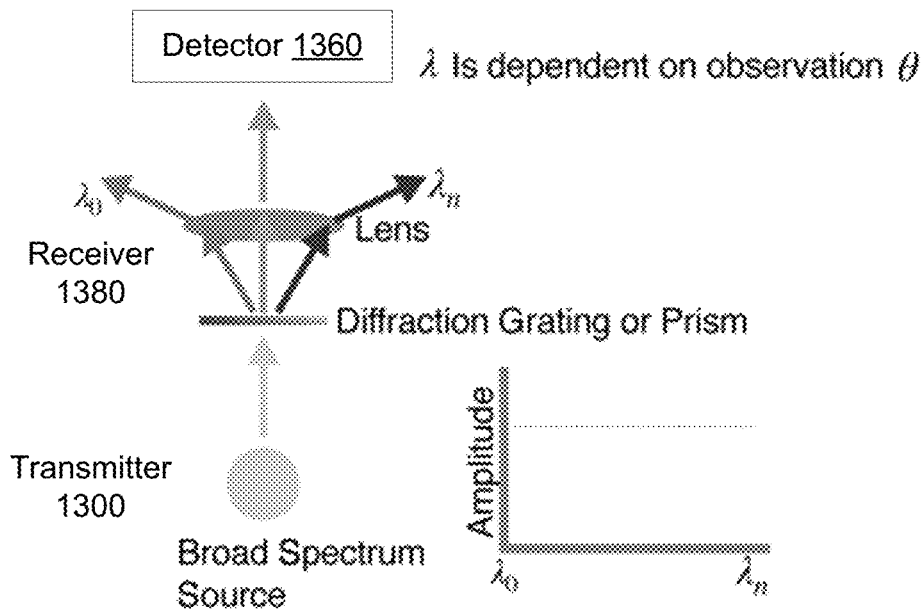
FIG. 13 illustrates a first technique for providing a directional source from which an observation angle can be estimated, according to some embodiments.
Figure 14:
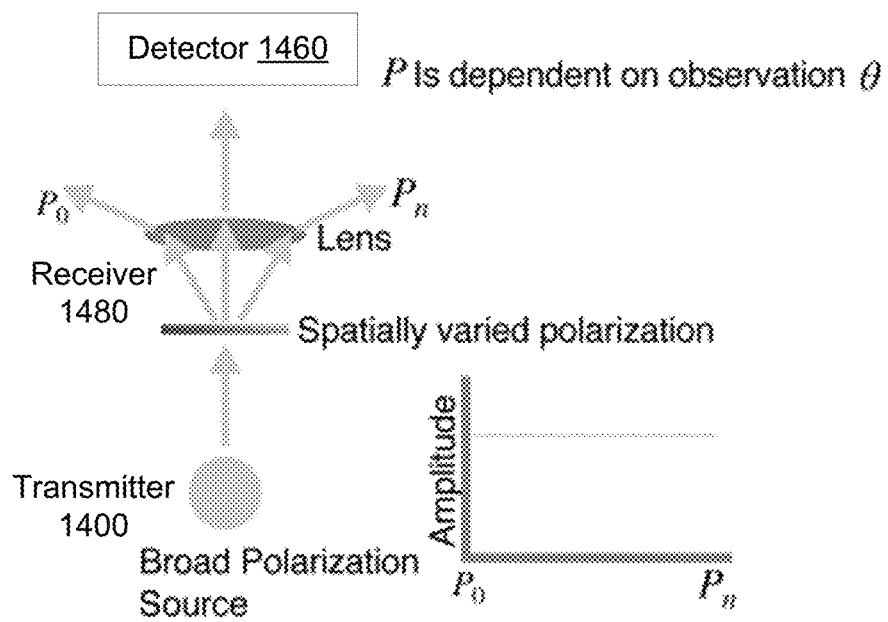
FIG. 14 illustrates a second technique for providing a directional source from which an observation angle can be estimated, according to some embodiments.
Figure 15:
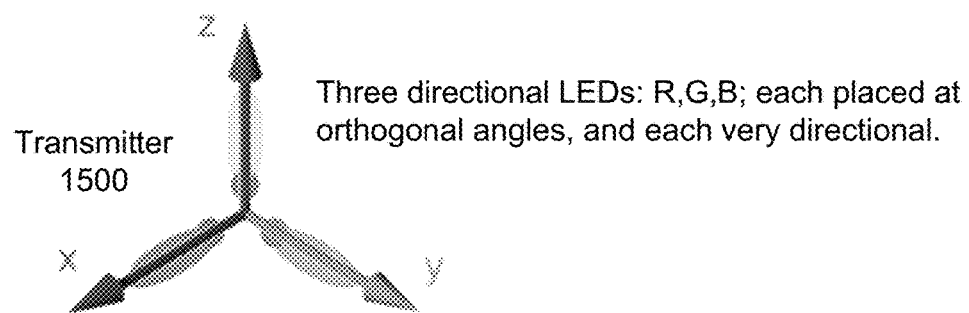
FIG. 15 illustrates a third technique for providing a directional source from which an observation angle can be estimated, according to some embodiments.
Figure 16:
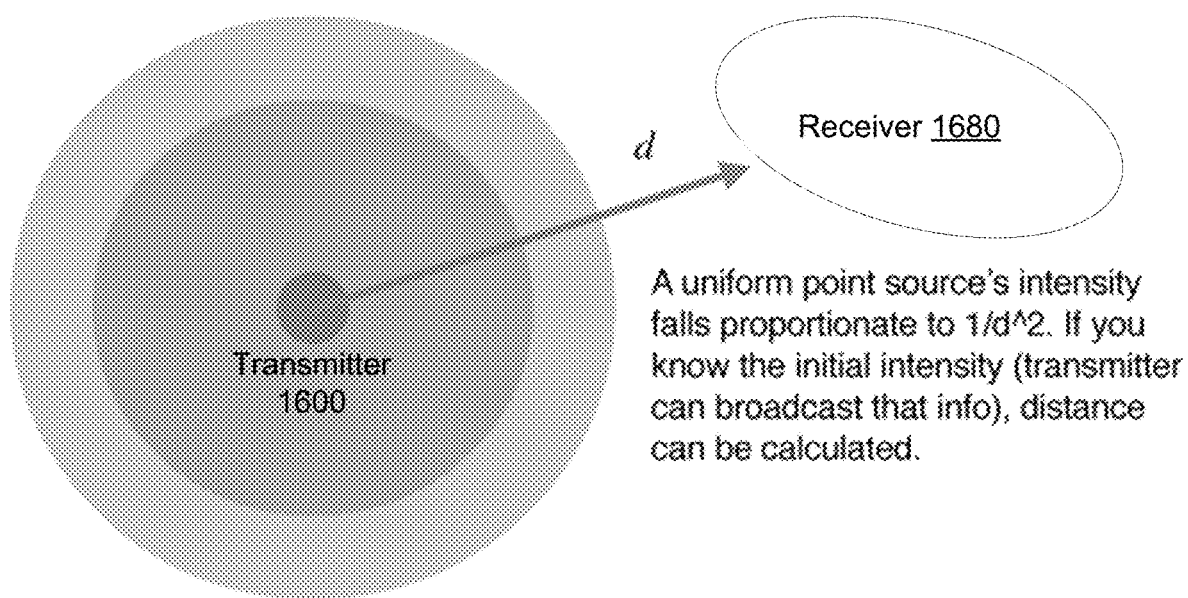
FIG. 16 illustrates a first technique for estimating a distance to a directional source, according to some embodiments.
Figure 17:
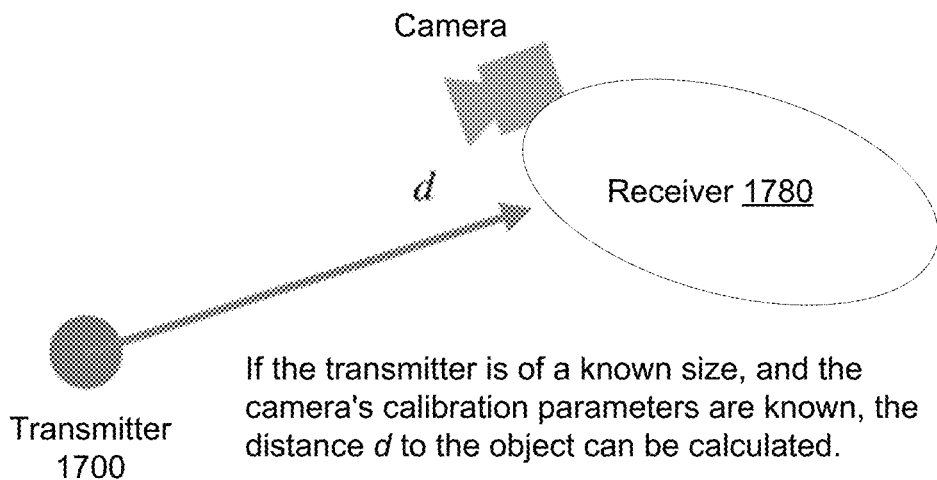
FIG. 17 illustrates a second technique for estimating a distance to a directional source, according to some embodiments.
Figure 18:
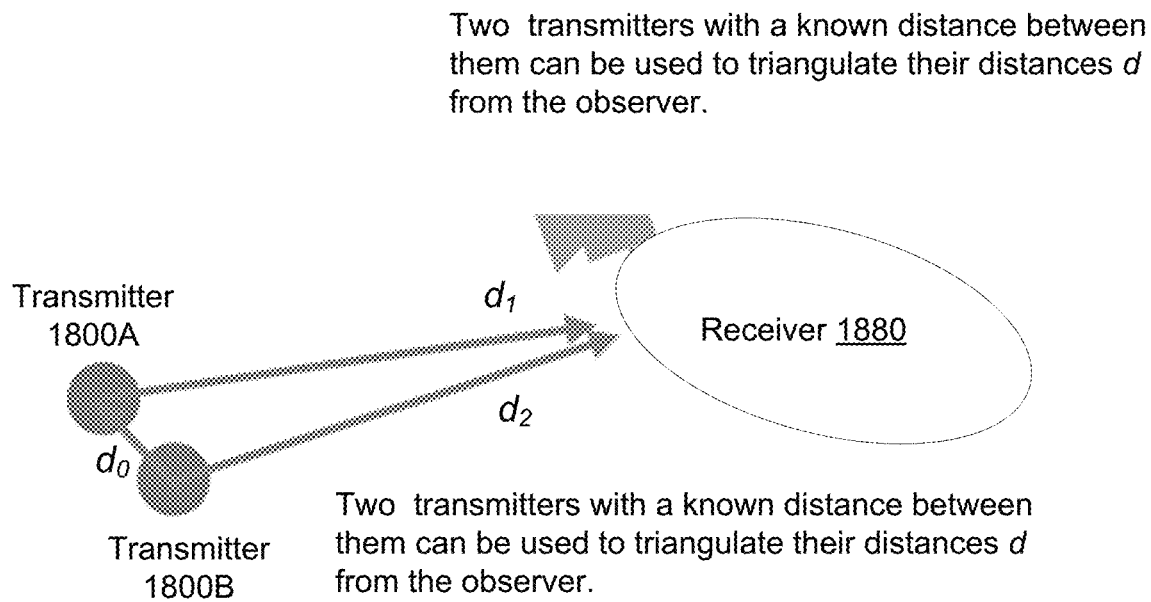
FIG. 18 illustrates a third technique for estimating a distance to a directional source, according to some embodiments.

Various embodiments of directional transmitters may be used to support the above localization methods. FIGS. 13 through 15 illustrate various techniques that may be implemented in embodiments of a directional transmitter and embodiments of a receiver (e.g., a steerable receiver as described herein) to determine the observation angle of the transmitter with respect to the receiver. FIGS. 16 through 18 illustrate various techniques that may be implemented in embodiments of a directional transmitter and embodiments of a receiver (e.g., a steerable receiver as described herein) to determine the distance of the transmitter from to the receiver. Note that the techniques illustrated in FIGS. 13 through 18 may be combined in embodiments to provide directional transmitters and receivers that may estimate both the observation angles and distances of transmitters and receivers from the directional transmitters' signals. Further note that in some embodiments the receivers may return the estimated localization information (direction and distance) to respective transmitters, for example via wireless signals (e.g., Bluetooth®, WIFI, etc.).

FIG. 13 illustrates a first technique for providing a directional source from which an observation angle can be estimated, according to some embodiments. In this embodiment, the transmitter 1300 is a broad spectrum source. The receiver 1380 includes at least a detector 1360, and a diffraction grating and lens that affect the light received at the detector 1360 from the transmitter 1300. The detected wavelength $\lambda$ is dependent on the observation angle $\theta$, and thus the observation angle $\theta$ can be estimated from the detected wavelength $\lambda$.

FIG. 14 illustrates a second technique for providing a directional source from which an observation angle can be estimated, according to some embodiments. In this embodiment, the transmitter 1400 is a broad polarization source. The receiver 1480 includes at least a detector 1460, and a spatially varied polarization filter and lens that affect the light received at the detector 1460 from the transmitter 1400. The detected polarization P is dependent on the observation angle $\theta$, and thus the observation angle $\theta$ can be estimated from the detected polarization P.

FIG. 15 illustrates a third technique for providing a directional source from which an observation angle can be estimated, according to some embodiments. Specifically, FIG. 15 illustrates an example method for implementing directional transmitters that emit light from which observation angles can be estimated at receivers. Note that other methods for implementing directional transmitters are possible. In this example embodiment, a transmitter 1500 may include three highly directional LEDs with calibrated wavelength or polarization. By placing each LED in an orthogonal direction (X,Y,Z), the overlaying colors/wavelengths or polarizations that the LEDs produce at each angle may be highly dependent on the observation angle, and have a 1:1 correspondence. In some embodiments, an omnidirectional (uniform distribution) LED of a different color or polarization may also accompany the transmitter to be used in normalization for intensity. Alternatively, a prism or diffraction grating may be used at the transmitter to generate the varying spectral pattern, along with some conditioning optics.

An example method of implementing a directional transmitter as illustrated in FIG. 15 is to pipe the output of an array of LEDs into fiber optics, closely bundled and angled at a node with lensing.

FIG. 16 illustrates a first technique for estimating a distance to a directional source, according to some embodiments. A uniform point light source's intensity falls proportional to $$\frac{1}{d^2}.$$

If the initial intensity is known (e.g., encoded in the signal from the transmitter 1600), the distance from the transmitter 1600 to the receiver 1680 can be calculated.

FIG. 17 illustrates a second technique for estimating a distance to a directional source, according to some embodiments. If the transmitter 1700 is of a known size, and the camera's calibration parameters are known, the distance d to the object (transmitter 1700) can be calculated at the receiver 1780.

FIG. 18 illustrates a third technique for estimating a distance to a directional source, according to some embodiments. Two transmitters 1800A and 1800B with a known distance do between the transmitters 1800 can be used to triangulate their respective distances $d_1$ and $d_2$ from the observer (receiver 1880).

Flowcharts

FIGS. 19 through 22 are high-level flowcharts of methods for providing reality-anchored digital content as described herein. These methods may be implemented according to one or more of the various transmitter and receiver devices and techniques as illustrated in FIGS. 1 through 18.

Figure 19:
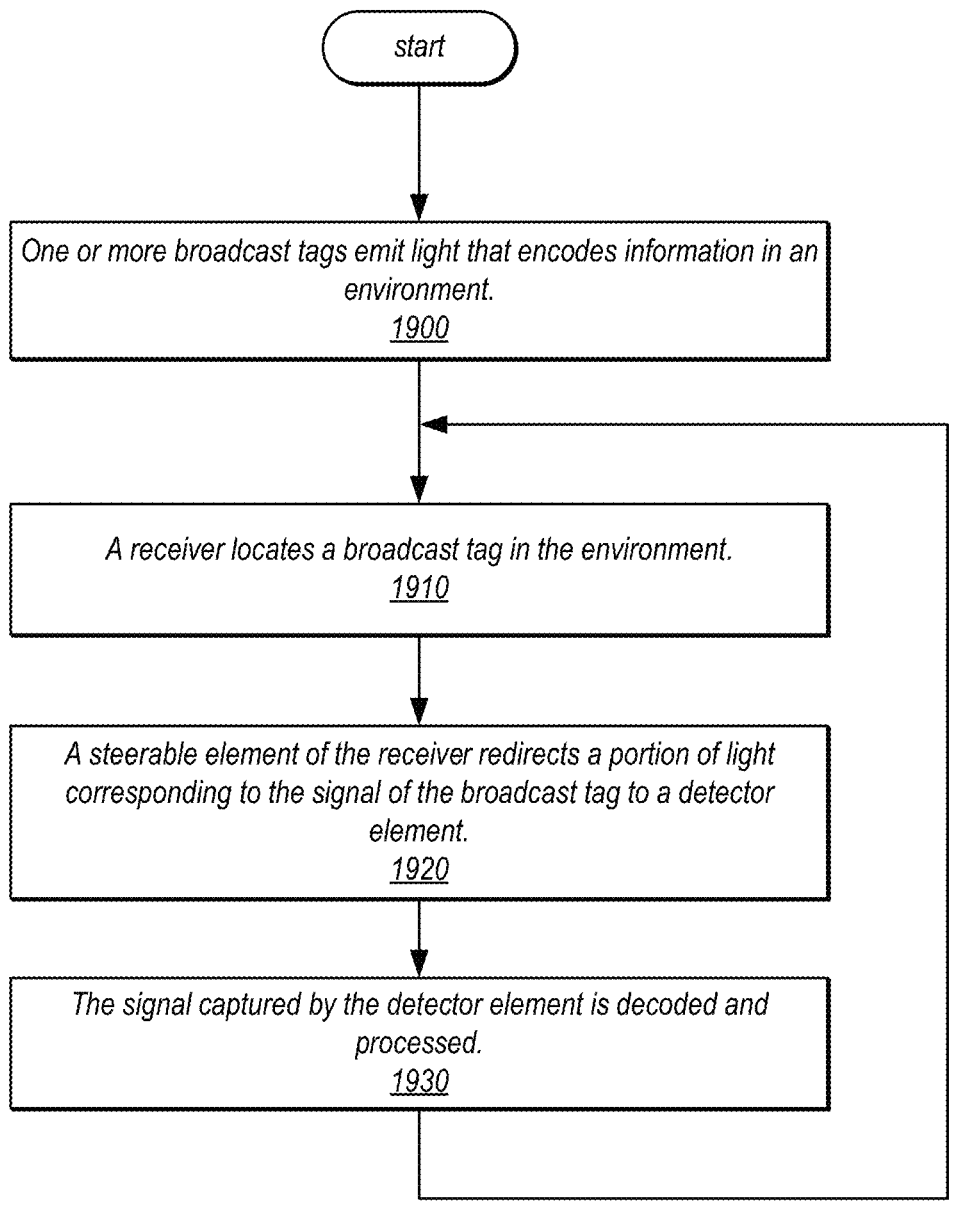
FIG. 19 is a high-level flowchart of a method for providing reality-anchored digital content, according to some embodiments.

FIG. 19 is a high-level flowchart of a method for providing reality-anchored digital content, according to some embodiments. As indicated at 1900, one or more broadcast tags emit light (e.g., infrared or near-infrared light) that encodes information in an environment. As indicated at 1910, a receiver locates a broadcast tag in the environment. For example, images of the environment captured by a camera component of the receiver may be processed to locate a signal from the transmitter. As indicated at 1920, a steerable element of the receiver redirects a portion of light corresponding to the signal of the broadcast tag to a detector element of the receiver. As indicated at 1930, the signal captured by the detector element is decoded and processed. For example, the signal may encode the information needed to render a virtual object, or alternatively a pre-rendered virtual object. One or more processors of a device that includes or is coupled to the receiver may decode and process the signal and display the respective virtual object at a location in 3D space corresponding to the transmitter.

Figure 20:
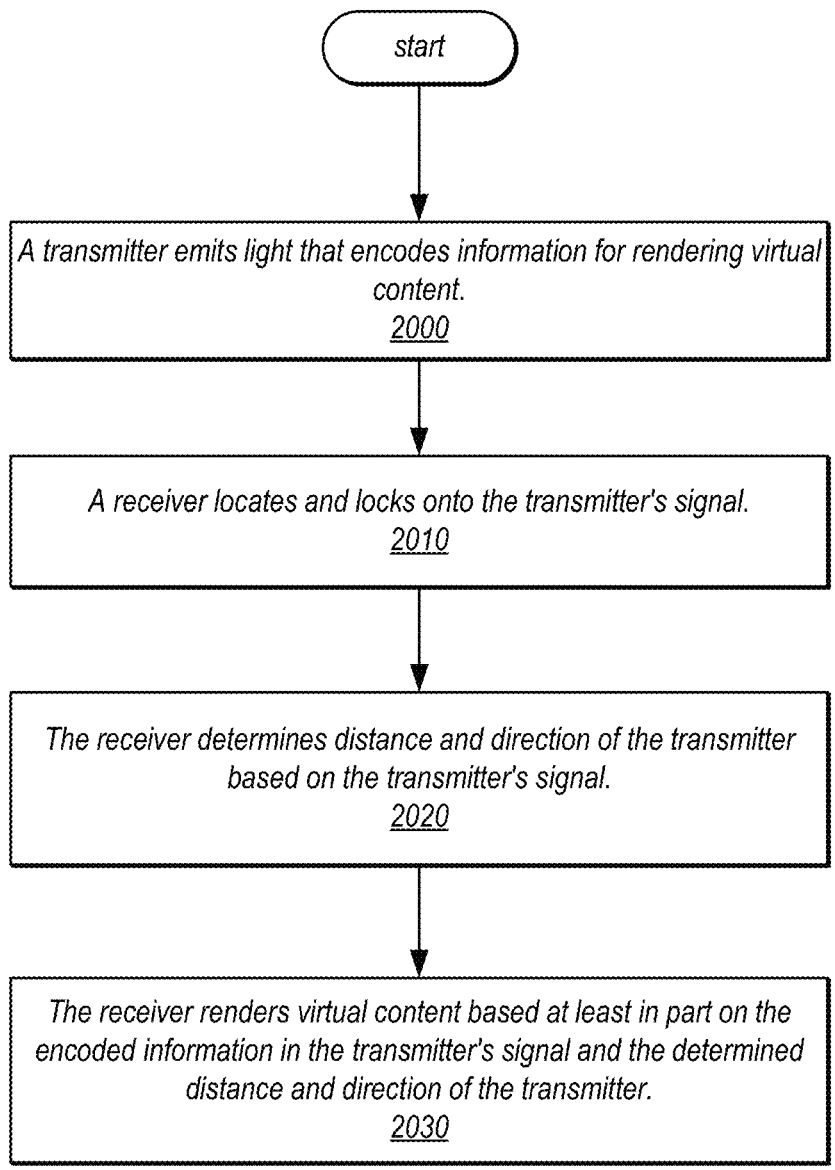
FIG. 20 is a high-level flowchart of a method for rendering virtual content at a receiver based at least in part on determined distance and direction of the transmitter, according to some embodiments.

FIG. 20 is a high-level flowchart of a method for rendering virtual content at a receiver based at least in part on determined distance and direction of the transmitter, according to some embodiments. As indicated at 2000, a transmitter emits light that encodes information for rendering virtual content. As indicated at 2010, a receiver locates and locks onto the transmitter's signal. As indicated at 2020, the receiver determines distance and direction of the transmitter based on the transmitter's signal. As indicated at 2030, the receiver renders virtual content based at least in part on the encoded information in the transmitter's signal and the determined distance and direction of the transmitter.

Figure 21:
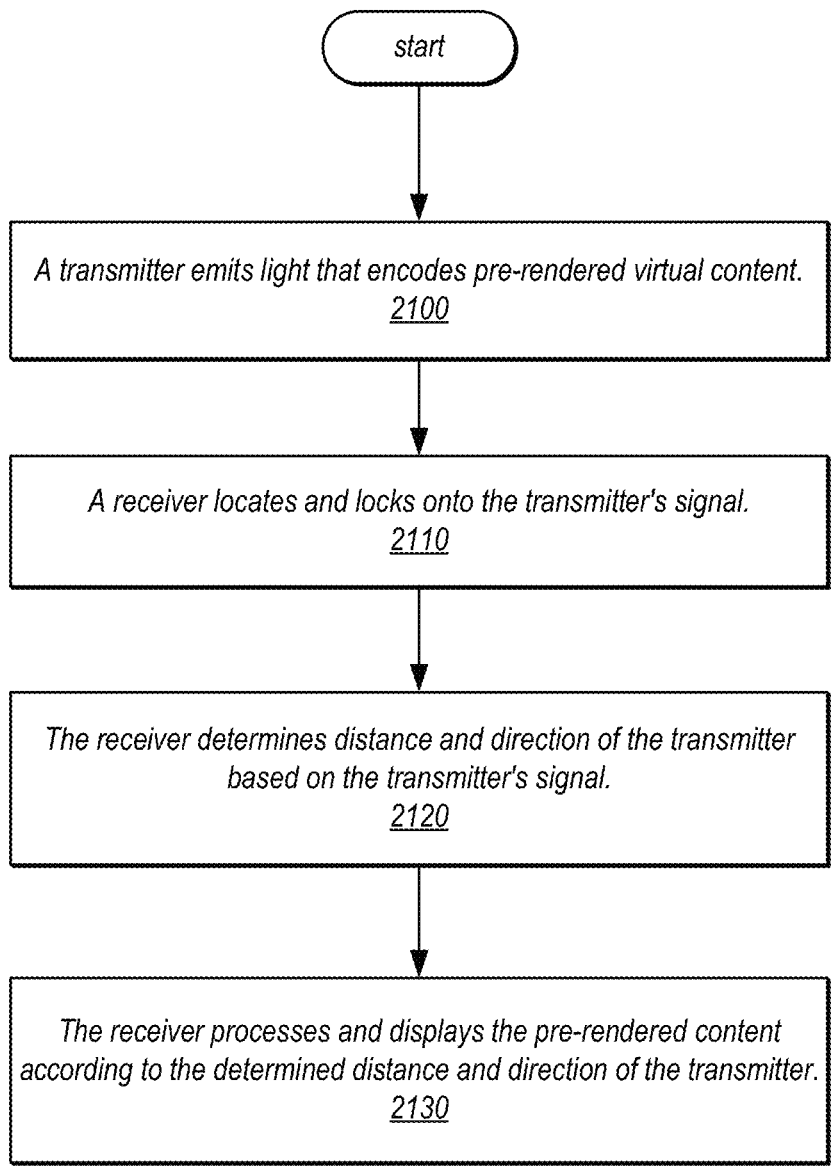
FIG. 21 is a high-level flowchart of a method for displaying pre-rendered virtual content at a receiver based at least in part on determined distance and direction of the transmitter, according to some embodiments.

FIG. 21 is a high-level flowchart of a method for displaying pre-rendered virtual content at a receiver based at least in part on determined distance and direction of the transmitter, according to some embodiments. As indicated at 2100, a transmitter emits light that encodes pre-rendered virtual content. As indicated at 2110, a receiver locates and locks onto the transmitter's signal. As indicated at 2120, the receiver determines distance and direction of the transmitter based on the transmitter's signal. As indicated at 2130, the receiver processes and displays the pre-rendered content according to the determined distance and direction of the transmitter.

Figure 22:
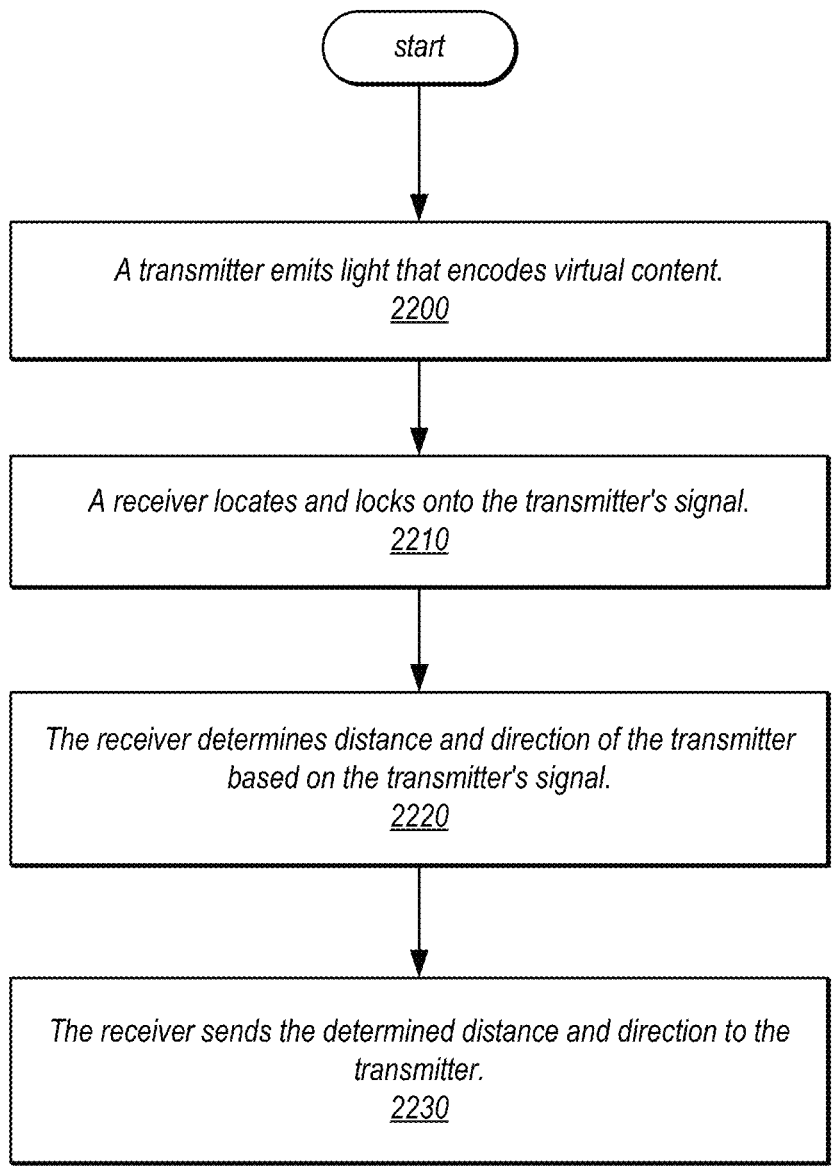
FIG. 22 is a high-level flowchart of a method for providing localization data determined at a receiver to the transmitter, according to some embodiments.

FIG. 22 is a high-level flowchart of a method for providing localization data determined at a receiver to the transmitter, according to some embodiments. As indicated at 2200, a transmitter emits light that encodes virtual content. As indicated at 2210, a receiver locates and locks onto the transmitter's signal. As indicated at 2220, the receiver determines distance and direction of the transmitter based on the transmitter's signal. As indicated at 2230, the receiver sends the determined distance and direction to the transmitter.

Bridging Between Devices

Figure 23A:
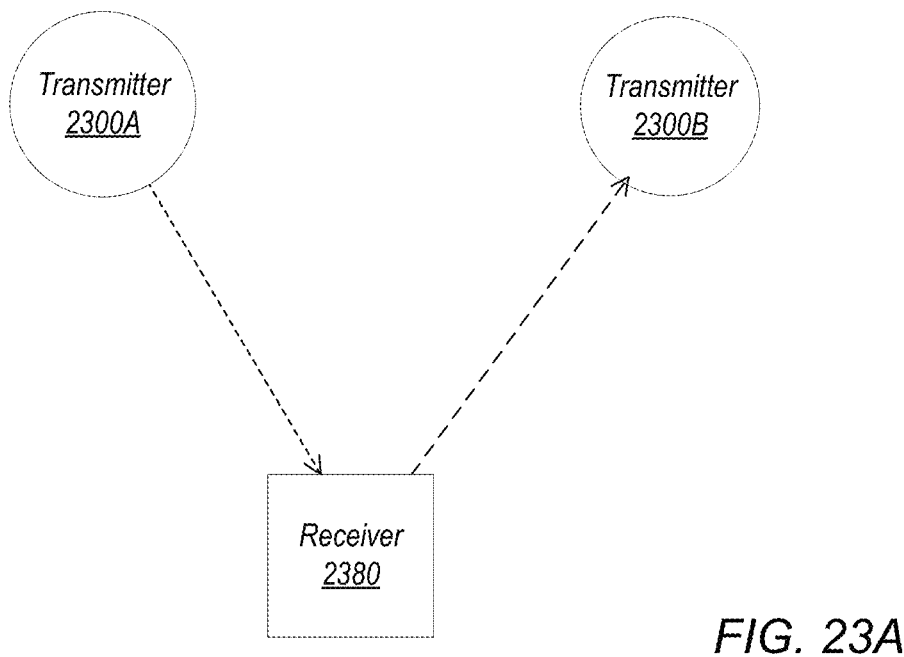
FIG. 23A illustrates a receiver acting as a "bridge" between two transmitters in an environment, according to some embodiments.

FIG. 23A illustrates a receiver 2380 acting as a "bridge" or "glue" between two transmitters in an environment, according to some embodiments. Transmitter 2300A may send a light signal encoding information to receiver 2380, which may decode the information and send data to transmitter 2300B, for example via a wireless signal.

Figure 23B:
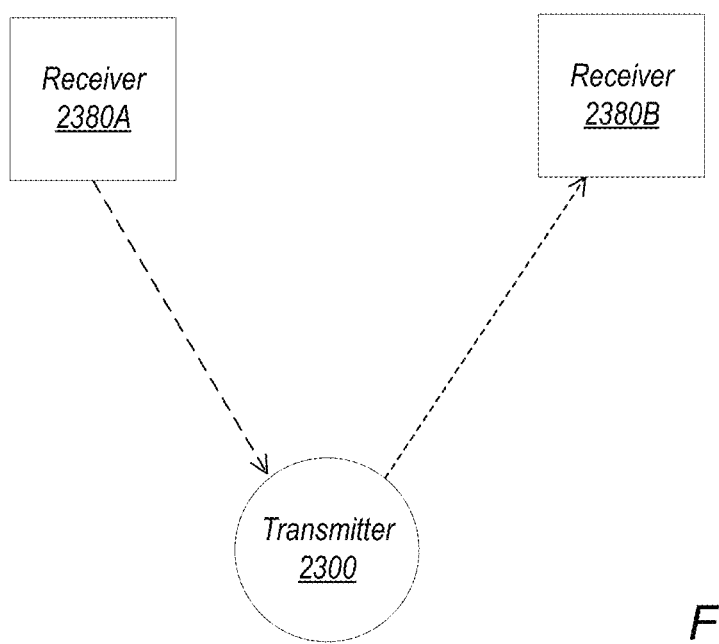
FIG. 23B illustrates a transmitter acting as a "bridge" between two receivers in an environment, according to some embodiments.

FIG. 23B illustrates a transmitter 2300 acting as a "bridge" between two receivers in an environment, according to some embodiments. Receiver 2380A may send data to transmitter 2300, for example via a wireless connection. Transmitter 2300 may send a light signal (e.g., an infrared, near-infrared, or visible light signal) including encoded information to receiver 2380B.

Example Applications

Embodiments of the methods and apparatus for providing reality-anchored digital content and of the transmitter and receiver devices and techniques as described herein may be used in any of a variety of real-world applications. Several non-limiting applications are described below.

Referring to FIGS. 1A through 1C, a transmitter 100 may send information for rendering particular virtual content, or pre-rendered virtual content, for an object, surface, or person associated with the transmitter. A device that includes the receiver 180, for example a smartphone or HMD, may process and display the virtual content received from the transmitter.

The virtual content may, for example, include information describing or identifying a person associated with the transmitter 100. For example, the person may be wearing a necklace or other accessory that includes a broadcast tag (the respective transmitter 100). Another person carrying or wearing a receiver-enabled device may use the receiver 180 to access the tagged person's information, which may be displayed by the device. The person owning the tag may control the information provided so that only the information that the person wishes to convey is provided, and only to persons that are authorized to obtain the information.

An audio device worn by a person may include a transmitter 100. Another person may have an audio device that implements a receiver 180. The receiver 180 may lock onto the transmitter 100 to obtain information (e.g., playlists, currently playing song, etc.) from the transmitter 100.

An indoor or outdoor event such as a sports event may have several cameras arranged to provide different views of the event. The cameras may include transmitters 100 as described herein. A person in the crowd may have a receiver-enabled device such as a smartphone, pad or tablet device, or HMD. The person may point their device towards particular cameras to receive information (e.g., references to video feeds) from the cameras so that the person can view the event from different viewpoints.

Advertising Example

An issue with unidirectional broadcasts as provided by the broadcast tags described herein is that much of the digital world is built around "advertising". Advertising in the digital world involves both providing content for viewing as well as surfacing information about those viewing the content to the content provider (e.g., a store owner that provides digital advertisements). As a related example, a video content creator who provides videos to a video streaming surface may want to obtain data about who is watching their videos. For sensing systems in a store or similar environment, the store owner may want to know where people are and where they go in the store, what routes they take, what items they view or pick up, and so on. Conventionally, stores and similar environments use camera-based systems to track people in their facilities. However, using cameras has privacy issues, can be expensive to install and maintain, and require a lot of manual effort and/or intense computation to extract information from the captured video. Embodiments of the transmitters and receivers as described herein may be leveraged to provide a system via which information about people in an environment such as a store can be obtained, but can be done without requiring conventional cameras and with reduced concerns about privacy.

In an example embodiment, a store owner may attach broadcast tags (transmitters 100) to items or displays, or elsewhere, in a store. A shopper in the store may carry or wear a receiver-enabled device such as a smartphone, pad or tablet device, or HMD. The receiver 180 may locate and lock onto particular broadcast tags in the store to view specific advertising information provided by the different broadcast tags. Localization information may be determined at the receiver-enabled device and fed back to the store owner (assuming the owner of the device has allowed their information to be shared). This information may be used by the store owner, for example to improve the way that merchandise is advertised in the store. This can be done without requiring conventional cameras and the necessary processing to extract information from the camera feeds. Further, this allows the shoppers to control whether or what information beyond simple location information is shared with the store owner.

In some embodiments, a store owner creates a broadcast tag that has content on it, and places it in the store at a location for customers to "see" with their receiver-enabled devices. A customer may walk into the store and observe the broadcast tag with their receiver-enabled device. As part of the signature handshake between the customer's device and the broadcast tag, on the backend, the observer's position relative to the transmitter, a time stamp, and other relevant information may be included in the information provided by the customer's device to a signature service (signatory). (See FIG. 24). Methods for determining the localization information for transmitters and receivers were previously described. The signatory can then pass this information along to the store owner so that the store owner can know that someone has observed this tag from this location at this time. Over time, this information may, for example, be used to build a "heat map" of customers' activities within the store. Note that personal information of the customers is not necessarily included in the information, so the only information the store owner may receive for a customer is location and time information.

This allows a store owner to build a system where they know when and from what perspective customers viewed a broadcast tag, without requiring the store owner to having any "sensing" capability (e.g., cameras) in the store. No camera, radar, or motions sensors are required; only the unidirectional broadcast tags are required to build a heat map of activity within a store. In essence, the observers (customers carrying receiver-enabled devices) are telling the store owner that the broadcast tags are being observed, and where and when the broadcast tags are being observed from.

In this system, the signatory shares the direction, position, and time information of persons who observe broadcast tags with an entity (e.g., a store owner). However, other information, such as device IDs of the customers' receiver-enabled devices or other identifying information, is not shared. A store owner can use this information to generate a "heat map" of the provided information to better understand activity within their store. However, this does not invade the privacy of the store's customers because the customers are not otherwise identified.

As an example, a store owner could place a broadcast tag in a window, and get a heat map of where most people observe the broadcast tag from as they walk past the store. That spatial/directional info may be valuable, for example in determining a particular angle from which most people observe the broadcast tag.

Productivity Example

Embodiments of the transmitters and receivers as described herein may be used to improve productivity in various environments and businesses. A brewery is given as a non-limiting example. Conventionally, in a brewery, handwritten "tasting charts" are kept at the vats; a tester may pick up the charts to note results of periodic tests of the contents of the vats. The transmitters and receivers as described herein may be leveraged with a device (e.g., a headset or hand-carried device) to digitize this process, and may also provide value-added benefits in productivity. The tester has sampling devices to measure various ester and alcohol content for the vats to determine how far along in the brewing process the vats are. These devices are not easily integrated into the vats. So the tester has to sample the vats, do the measurements, and record the measurements on the charts.

In embodiments, a vat can have an integrated or attached broadcast tag with an associated data repository. A sampling device also has an integrated or attached broadcast tag. The device (e.g., a headset or hand-carried device) carried by the tester has an integrated or attached receiver that can act as a bridge or glue between the vat tag and the sampling device tag. When the tester measures the content of the vat with the sampling device, the sampling device broadcasts the results to the receiver, which then sends measurement information to the vat tag to be recorded in the data repository. Via the bridging provided by the receiver, another person can go to the vat with another receiver-enabled device and access the data repository via the vat tag to see up-to-data sensing information that was previously recorded by the tester's receiver-enabled device. Instead of having to walk around, pick up charts, and decipher the handwritten notes, all of the vat-related information can be directly accessible by a person walking around with a receiver-enabled device. The vat-related information may also be directly uploaded to the cloud or other storage. Thus, the vat-related information can be constantly updated and retrieved from virtually anywhere.

In this scenario, the vat tag may broadcast information including its ID, its signature, its Bluetooth ID, and a temporary pairing key (encrypted). Only personnel that allowed to access a vat's information are provided with a digital key to access the vat. The vat tag may also convey information that may be used to render virtual content associated with the vat so that the receiver-enabled device can render and display the vat's recorded measurement data.

A sampling device also has a broadcast tag associated with it that may provide similar information. The sampling device may also provide other information such as its last calibration date and step-by-step instructions for using the sampling device. These instructions may be useful from a training standpoint, as they can help a person get up to speed with various sampling devices. Using the broadcast tags removes the need for the person in the brewery to try to find a URL or other reference for the data sheet or instruction manual of a device; this information is obtained dynamically from the device itself.

A receiver-enabled device carried by a person in the brewery can "tune in" to the vat tag and the sampling tool tag to obtain their IDs. The receiver-enabled device may then access a signatory service to determine if the IDs are valid. If both IDs are valid, the sampling device provides its assets, including the measurements it has made for the vat. Once the sampling device has provided the measurements to the receiver-enabled device, the receiver-enabled device may use its temporary pairing key to access the vat tag and record the measurement data to the vat's data repository over a wireless connection (e.g., Bluetooth®, WIFI, etc.).

By providing broadcast tags and steerable receivers as described herein, receiver-enabled devices such as AR devices can move around and act as "glue" between broadcast-enabled devices. The spatial specificity of the transmitters and receivers provides a very natural and seamless human interface. A person wearing a receiver-enabled device can just look at an object; if the object has a broadcast tag, the person can interact with the object digitally. In addition, transmitters can be selected without changing the observer's view direction and without requiring the observer to look at the respective objects. For example if multiple transmitters are within the field of view of an observer, the steering capability of the receiver can be used to select data from one transmitter at a time without requiring the observer to change their view direction. In some embodiments, multiple transmitters may be presented to the observer, and the observer may select an object of interest corresponding to a particular transmitter. For example, in some embodiments when using a handheld device such as a smartphone, the user may tap a representation of the object on the screen to select the object that data should be received from. In some embodiments when using a device that has gaze tracking technology, gaze tracking may be used to select from among transmitters within the field of view.

Establishing Trust.

Figure 24:
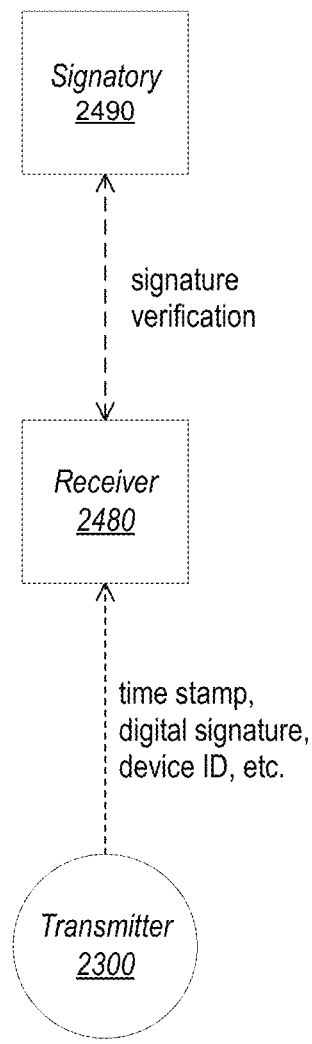
FIG. 24 illustrates establishing trust between a transmitter and a receiver, according to some embodiments.

FIG. 24 illustrates establishing trust between a transmitter 2400 and a receiver 2480, according to some embodiments. Embodiments may provide trust and security functionality for receiver-enabled devices when communicating with broadcast tags in an environment. Because a broadcast tag (transmitter 2400) sends a light-encoded digital broadcast and the light signal has a high enough data rate, the broadcast tag can send a digital signature in its data stream. In some embodiments, the digital signature can be time-varying. In some embodiments, the broadcast tag can send a time stamp, digital signature, and device ID in its light-encoded digital stream. With that information, a receiver-enabled device (receiver 2480) can reach out to a trusted signing service (signatory 2490) to confirm if the broadcast tag is valid and is transmitting something approved; this builds trust between transmitters 2400 and receivers 2480.

The layers of trust can be tuned. For example, some broadcast tags may not provide a digital signature, just broadcasting data, and owners of receiver-enabled devices can decide whether they want to receive data from the tags. As another example, a broadcast tag may include a digital signature that can be used to verify that it is a valid tag, but may not provide validation for the content of the data stream it provides, which is streamed to the tag from an external source. Thus, the owner of the receiver-enabled device may validate the tag, and choose to view the streamed content at their own risk. As another example, a broadcast tag may provide a digital signature to verify the tag as well as a digital signature to verify the content that it is streaming.

Example Devices

FIGS. 25A and 25B are block diagrams illustrating a device that may include or be attached to a steerable receiver as illustrated in FIGS. 1A through 21, according to some embodiments. An example application of a steerable receiver used in the methods and apparatus for providing reality-anchored digital content as described herein is in a handheld device 3000 such as smartphone, pad, or tablet. FIG. 25A shows a side view of an example device 3000, and FIG. 25B shows an example top view of the example device 3000. Device 3000 may include, but is not limited to, a display screen 3010 located on a "front" of the device 3000, a controller 3060 comprising one or more processors, memory 3070, pose, motion, and orientation sensors (not shown), and one or more other cameras or sensing devices 3050 such as visible light cameras and depth sensors. A steerable receiver 3080 as described herein may be attached to or integrated in the device 3000 (e.g., facing a "back" side of the device 3000), and the device 3000 may be moved by the user to locate, lock on to, and receive information from a broadcast tag 3092 in an environment such as a room or an outdoors environment. This information may, for example, be processed by controller 3060 to render virtual content associated with an object, surface, or person associated with a tag for display by the device 3000.

Note that device 3000 as illustrated in FIGS. 25A and 25B is given by way of example, and is not intended to be limiting. In various embodiments, the shape, size, and other features of a device 3000 may differ, and the locations, numbers, types, and other features of the components of a device 3000 may vary.

FIGS. 26A and 26B are block diagrams illustrating another device that may include or be attached to a steerable receiver as illustrated in FIGS. 1A through 21, according to some embodiments. FIG. 26A shows a side view of an example device 4000, and FIG. 26B shows a top view of the example device 4000. Note that device 4000 as illustrated in FIGS. 26A and 26B is given by way of example, and is not intended to be limiting. In various embodiments, the shape, size, and other features of a device 4000 may differ, and the locations, numbers, types, and other features of the components of a device 4000 may vary.

Device 4000 may include a user-facing display 4010. User-facing display 4010 may implement any of various types of display technologies. For example, device 4000 may include a display system 4010 that displays left and right images on screen(s) that are viewed by a subject, such as DLP (digital light processing), LCD (liquid crystal display) and LCOS (liquid crystal on silicon) technology display systems. As another example, display system 4010 may be a direct retinal projector system that scans left and right images, pixel by pixel, to the subject's eyes. To scan the images, projectors generate beams that are directed to reflective components that redirect the beams to the user's eyes. In some embodiments, device 4000 may be worn on a user's head so that the display 4010 is disposed in front of the user's eyes. Thus, device 4000 may be a head-mounted device (HMD) with integrated display 4010, or alternatively may be a head mounted system configured to accept an external opaque display (e.g., a smartphone).

Device 4000 may include one or more world-facing sensors 4050 that collect information about the environment (video, depth information, lighting information, etc.), and in some embodiments may also include one or more user-facing sensors (not shown) that collect information about the user (e.g., eye or gaze tracking sensors, video of various portions of the user's face). The user-facing sensors may include, but are not limited to, one or more eye tracking cameras (e.g., infrared (IR) cameras) that capture views of the user's eyes, one or more cameras (e.g., RGB video cameras) that capture views of various portions of the user's face, and/or sensors that capture depth information for the user's face. The world-facing sensors 4050 may include, but are not limited to, one or more cameras (e.g., visible light RGB video cameras) that capture images of the real world environment in a field of view in front of the device 4000, and one or more ambient light sensors that capture lighting information for the environment. In some embodiments, the world-facing sensors 4050 may also include sensors that capture depth information for objects and surfaces in the environment. Device 4000 may also include pose, motion, and orientation sensors (not shown). Device 4000 may also include a steerable receiver 4080 as described herein attached to or integrated in the device 4000

A controller 4060 may be implemented in the device 4000, or alternatively may be implemented at least in part by an external device (e.g., a computing system or handheld device such as a smartphone, pad, or tablet) that is communicatively coupled to device 4000 via a wired or wireless interface. Controller 4060 may include one or more of various types of processors, image signal processors (ISPs), graphics processing units (GPUs), coder/decoders (codecs), system on a chip (SOC), CPUs, and/or other components for processing and rendering information captured by the world-facing sensors 4050, user-facing sensors (if present), pose, motion, and orientation sensors, and steerable receiver 4080. Steerable receiver 4080 may be used to locate, lock on to, and receive information from a broadcast tag 4092 in an environment such as a room or an outdoors environment. Controller 4060 may, for example, be configured to render frames that include virtual content based at least in part on the information obtained by the steerable receiver 4080, and may provide the rendered frames to display 4010.

Memory 4070 may be implemented in the device 4000, or alternatively may be implemented at least in part by an external device (e.g., a computing system, smartphone, etc.) that is communicatively coupled to device 4000 via a wired or wireless interface. Memory 4070 may, for example, be used to record information captured by the sensors, to store program instructions that are executable by the controller 4060, and to store data that are used by the controller. Memory 4070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Embodiments of a device 4000 as illustrated in FIGS. 26A and 26B may, for example, be used in augmented or mixed (AR) applications to provide augmented or mixed reality views to the user. Device 4000 may include one or more sensors that collect information about the environment (video, depth information, lighting information, specular surface information, etc.); the sensors may provide the collected information to controller 4060 of the device 4000. The sensors 4050 may include one or more visible light cameras (e.g., RGB video cameras) that capture video of the environment that may be used to provide the user with a virtual view of their real environment. In some embodiments, video streams of the real environment captured by the visible light cameras may be processed by the controller 4060 of the device 4000 to render augmented or mixed reality frames that include virtual content overlaid on the view of the real environment based at least in part on generated 3D mapping information, and the rendered frames may be provided to display 4010. The steerable receiver 4080 may locate, lock on to, and receive information from a broadcast tag 4092 in an environment such as a room or an outdoors environment. This information may, for example, be processed by controller 4060 to render virtual content associated with an object, surface, or person associated with a tag 4092 for display by the device 4000.

As another example, embodiments of a device 4000 as illustrated in FIGS. 26A and 26B may be used in virtual reality (VR) applications to provide virtual reality views to the user. A VR application allows users to experience and/or interact with an immersive artificial environment, such that the user feels as if they were physically in that environment. In some embodiments, the controller 4060 of the device 4000 may render virtual reality frames based at least in part on generated 3D mapping information, and the rendered frames may be provided to display 4010. The steerable receiver 4080 may locate, lock on to, and receive information from a broadcast tag 4092 in an environment such as a room or an outdoors environment. This information may, for example, be processed by controller 4060 to render virtual content associated with an object, surface, or person associated with a tag for display by the device 4000.

Device 4000 may, for example, be a head-mounted device (HMD)) such as an HMD used in computer-generated reality (CGR) systems. An HMD may include a clear user-facing display 4010 (e.g., glass or plastic lenses) through which the user views the real environment and via which virtual content is overlaid on the user's view of the environment via a projection system. Alternatively, an HMD may include an opaque user-facing display 4010 on which CGR content is displayed for viewing by the user. As another alternative, a head mounted system may be configured to accept an external opaque display (e.g., a smartphone).

Extended Reality

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

The following clauses describe various examples embodiments consistent with the description provided herein.

Clause 1. A device, comprising:
a receiver configured to receive a signal from a transmitter in an environment, wherein the signal encodes digital information specific to the transmitter; and
one or more processors configured to:
estimate distance and direction of the transmitter in the environment based at least in part on the received signal; and
process the encoded digital information in the signal based at least in part on the estimated distance and direction of the transmitter to display virtual content corresponding to a location of the transmitter in the environment.

Clause 2. The device as recited in clause 1, wherein the distance and the direction of the transmitter are estimated in world coordinates of the transmitter.

Clause 3. The device as recited in clause 1, wherein the signal is a light signal, wherein the transmitter emits light at wavelengths that vary with a 1:1 correspondence to observation angle, and wherein, to estimate direction of the transmitter in the environment based on the received signal, the one or more processors are configured to estimate the direction of the transmitter based on wavelength of the signal received at the receiver.

Clause 4. The device as recited in clause 1, wherein the signal is a light signal, wherein the transmitter emits light at polarizations that vary with a 1:1 correspondence to observation angle, and wherein, to estimate direction of the transmitter in the environment based on the received signal, the one or more processors are configured to estimate the direction of the transmitter based on polarization of the signal received at the receiver.

Clause 5. The device as recited in clause 1, wherein the signal is a light signal, wherein the transmitter emits light at an intensity known by the device, and wherein, to estimate distance of the transmitter in the environment based on the received signal, the one or more processors are configured to estimate the distance of the transmitter based on a comparison of the known intensity of the light emitted at the transmitter to the intensity of the signal received at the receiver.

Clause 6. The device as recited in clause 1, wherein the receiver includes a camera, wherein a size of the transmitter is known by the device, and wherein, to estimate distance of the transmitter in the environment, the one or more processors are configured to estimate the distance of the transmitter based on a comparison of an image of the transmitter captured by the camera and the known size of the transmitter.

Clause 7. The device as recited in clause 1, wherein the signal is a light signal, wherein the transmitter emits light with modulation that varies with a 1:1 correspondence to observation angle, and wherein, to estimate direction of the transmitter in the environment based on the received signal, the one or more processors are configured to estimate the direction of the transmitter based on modulation of the signal received at the receiver.

Clause 8. The device as recited in clause 7, wherein the modulation is in the frequency domain.

Clause 9. The device as recited in clause 7, wherein the modulation varies in amplitude based on the observation angle.

Clause 10. The device as recited in clause 7, wherein the modulation conveys data that indicates respective observation angles.

Clause 11. The device as recited in clause 1, wherein the digital information encoded in the signal varies according to the direction of the receiver with respect to the transmitter.

Clause 12. The device as recited in clause 1, wherein the signal is a light signal, and wherein the receiver comprises:
- a detector element comprising at least one photodiode; and
- a steerable element configured to select a light beam from the transmitter and send the selected light beam to the detector element.

Clause 13. The device as recited in clause 12, wherein the receiver further comprises a camera configured to detect the light signal of the transmitter in the environment, wherein the transmitter emits light that encodes the digital information specific to the transmitter into the environment.

Clause 14. The device as recited in clause 13, wherein the one or more processors are further configured to:
- process images captured by the camera to detect the light signal of the transmitter;
- direct the steerable element to select the light beam from the transmitter and send the selected light beam to the detector element; and
- process encoded digital information in the light beam captured by the detector element based at least in part on the estimated distance and direction of the transmitter to display the virtual content corresponding to the location of the transmitter in the environment.

Clause 15. The device as recited in clause 1, wherein the transmitter broadcasts light within an infrared (IR) range and modulates the light to provide the signal that encodes the digital information according to a data protocol.

Clause 16. The device as recited in clause 1, wherein the encoded digital information includes information for rendering the virtual content, and wherein, to process the encoded digital information in the signal based at least in part on the estimated distance and direction of the transmitter to display virtual content corresponding to a location of the transmitter in the environment, the one or more processors are configured to render the virtual content based on the encoded digital information and the estimated distance and direction of the transmitter in the environment.

Clause 17. The device as recited in clause 1, wherein the encoded digital information includes pre-rendered virtual content based on the direction of the transmitter with respect to the receiver, and wherein, to process the encoded digital information in the signal based at least in part on the estimated distance and direction of the transmitter to display virtual content corresponding to a location of the transmitter in the environment, the one or more processors are configured to process the pre-generated virtual content based at least in part on the estimated distance of the transmitter in the environment.

Clause 18. A method, comprising:
- receiving, at a receiver in a device, a signal that encodes digital information specific to a transmitter in an environment;
- estimating, by one or more processors of the device, distance and direction of the transmitter in the environment based at least in part on the received signal; and
- processing, by the one or more processors, the encoded digital information in the signal based at least in part on the estimated distance and direction of the transmitter to display virtual content corresponding to a location of the transmitter in the environment.

Clause 19. The method as recited in clause 18, further comprising estimating the distance and the direction of the transmitter in world coordinates of the transmitter.

Clause 20. The method as recited in clause 18, wherein the signal is a light signal, wherein the transmitter emits light at wavelengths that vary with a 1:1 correspondence to observation angle, and wherein estimating direction of the transmitter in the environment based on the received signal comprises estimating the direction of the transmitter based on wavelength of the signal received at the receiver.

Clause 21. The method as recited in clause 18, wherein the signal is a light signal, wherein the transmitter emits light at polarizations that vary with a 1:1 correspondence to observation angle, and wherein estimating direction of the transmitter in the environment based on the received signal comprises estimating the direction of the transmitter based on polarization of the signal received at the receiver.

Clause 22. The method as recited in clause 18, wherein the signal is a light signal, wherein the transmitter emits light at an intensity known by the device, and wherein estimating distance of the transmitter in the environment based on the received signal comprises estimating the distance of the transmitter based on a comparison of the known intensity of the light emitted at the transmitter to the intensity of the signal received at the receiver.

Clause 23. The method as recited in clause 18, wherein the receiver includes a camera, wherein a size of the transmitter is known by the device, and wherein estimating distance of the transmitter in the environment comprises estimating the distance of the transmitter based on a comparison of an image of the transmitter captured by the camera and the known size of the transmitter.

Clause 24. The method as recited in clause claim 18, wherein the signal is a light signal, wherein the transmitter emits light with modulation that varies with a 1:1 correspondence to observation angle, and wherein estimating direction of the transmitter in the environment based on the received signal comprises estimating the direction of the transmitter based on modulation of the signal received at the receiver.

Clause 25. The method as recited in clause 24, wherein the modulation is in the frequency domain.

Clause 26. The method as recited in clause 24, wherein the modulation varies in amplitude based on the observation angle.

Clause 27. The method as recited in clause 24, wherein the modulation conveys data that indicates respective observation angles.

Clause 28. The method as recited in clause claim 18, wherein the digital information encoded in the signal varies according to the direction of the receiver with respect to the transmitter.

Clause 29. The method as recited in clause 18, wherein the encoded digital information includes information for rendering the virtual content, and wherein processing the encoded digital information in the signal based at least in part on the estimated distance and direction of the transmitter to display virtual content corresponding to a location of the transmitter in the environment comprises rendering the virtual content based on the encoded digital information and the estimated distance and direction of the transmitter in the environment.

Clause 30. The method as recited in clause 18, wherein the encoded digital information includes pre-rendered virtual content based on the direction of the transmitter with respect to the receiver, and wherein processing the encoded digital information in the signal based at least in part on the estimated distance and direction of the transmitter to display virtual content corresponding to a location of the transmitter in the environment comprises processing the pre-generated virtual content based at least in part on the estimated distance of the transmitter in the environment.

Clause 31. A device, comprising:
one or more processors; and
a transmitter configured to broadcast a light signal in an environment, wherein the light signal encodes digital information specific to the transmitter under control of the one or more processors; and
wherein the light signal conveys information configured to be used by a receiver to determine distance and direction of the transmitter from the receive in world coordinates of the transmitter.

Clause 32. The device as recited in clause 31, wherein, to convey the information, the transmitter emits light at wavelengths that vary with a 1:1 correspondence to observation angle.

Clause 33. The device as recited in clause 31, wherein, to convey the information, the transmitter emits light at polarizations that vary with a 1:1 correspondence to observation angle.

Clause 34. The device as recited in clause 31, wherein, to convey the information, the transmitter emits light with modulation that varies with a 1:1 correspondence to observation angle.

Clause 35. The device as recited in clause 34, wherein the modulation conveys data that indicates respective observation angles.

Clause 36. The device as recited in clause 31, wherein, to convey the information, the transmitter emits light at frequencies that vary with a 1:1 correspondence to observation angle.

Clause 37. The device as recited in clause 31, wherein the digital information encoded in the light signal varies according to the direction of the receiver with respect to the transmitter.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
a receiver configured to receive a signal from a transmitter in an environment, wherein the signal encodes digital information specific to the transmitter that varies according to an observation angle of the transmitter mapping to the receiver; and
one or more processors configured to:
estimate distance and direction of the transmitter in the environment based at least in part on the received signal evaluated with respect to the observation angle mapping to the transmitter; and
process the encoded digital information in the signal based at least in part on the estimated distance and direction of the transmitter to display virtual content corresponding to a location of the transmitter in the environment.

2. The device as recited in claim 1, wherein the distance and the direction of the transmitter are estimated in world coordinates of the transmitter.

3. The device as recited in claim 1, wherein the signal is a light signal, wherein the transmitter emits light at wavelengths that vary with a 1:1 correspondence to observation angle, and wherein, to estimate direction of the transmitter in the environment based on the received signal, the one or more processors are configured to estimate the direction of the transmitter based on wavelength of the signal received at the receiver.

4. The device as recited in claim 1, wherein the signal is a light signal, wherein the transmitter emits light at polarizations that vary with a 1:1 correspondence to observation angle, and wherein, to estimate direction of the transmitter in the environment based on the received signal, the one or more processors are configured to estimate the direction of the transmitter based on polarization of the signal received at the receiver.

5. The device as recited in claim 1, wherein the signal is a light signal, wherein the transmitter emits light at an intensity known by the device, and wherein, to estimate distance of the transmitter in the environment based on the received signal, the one or more processors are configured to estimate the distance of the transmitter based on a comparison of the known intensity of the light emitted at the transmitter to the intensity of the signal received at the receiver.

6. The device as recited in claim 1, wherein the receiver includes a camera, wherein a size of the transmitter is known by the device, and wherein, to estimate distance of the transmitter in the environment, the one or more processors are configured to estimate the distance of the transmitter based on a comparison of an image of the transmitter captured by the camera and the known size of the transmitter.

7. The device as recited in claim 1, wherein the signal is a light signal, wherein the transmitter emits light with modulation that varies with a 1:1 correspondence to observation angle, and wherein, to estimate direction of the transmitter in the environment based on the received signal, the one or more processors are configured to estimate the direction of the transmitter based on modulation of the signal received at the receiver.

8. The device as recited in claim 7, wherein the modulation is in the frequency domain.

9. The device as recited in claim 7, wherein the modulation varies in amplitude based on the observation angle.

10. The device as recited in claim 7, wherein the modulation conveys data that indicates respective observation angles.

11. The device as recited in claim 1, wherein the digital information encoded in the signal varies according to the direction of the receiver with respect to the transmitter.

12. The device as recited in claim 1, wherein the signal is a light signal, and wherein the receiver comprises:
- a detector element comprising at least one photodiode; and
- a steerable element configured to select a light beam from the transmitter and send the selected light beam to the detector element.

13. The device as recited in claim 12, wherein the receiver further comprises a camera configured to detect the light signal of the transmitter in the environment, wherein the transmitter emits light that encodes the digital information specific to the transmitter into the environment.

14. The device as recited in claim 13, wherein the one or more processors are further configured to:
- process images captured by the camera to detect the light signal of the transmitter;
- direct the steerable element to select the light beam from the transmitter and send the selected light beam to the detector element; and
- process encoded digital information in the light beam captured by the detector element based at least in part on the estimated distance and direction of the transmitter to display the virtual content corresponding to the location of the transmitter in the environment.

15. The device as recited in claim 1, wherein the transmitter broadcasts light within an infrared (IR) range and modulates the light to provide the signal that encodes the digital information according to a data protocol.

16. The device as recited in claim 1, wherein the encoded digital information includes information for rendering the virtual content, and wherein, to process the encoded digital information in the signal based at least in part on the estimated distance and direction of the transmitter to display virtual content corresponding to a location of the transmitter in the environment, the one or more processors are configured to render the virtual content based on the encoded digital information and the estimated distance and direction of the transmitter in the environment.

17. The device as recited in claim 1, wherein the encoded digital information includes pre-rendered virtual content based on the direction of the transmitter with respect to the receiver, and wherein, to process the encoded digital information in the signal based at least in part on the estimated distance and direction of the transmitter to display virtual content corresponding to a location of the transmitter in the environment, the one or more processors are configured to process the pre-generated virtual content based at least in part on the estimated distance of the transmitter in the environment.

18. A method, comprising:
- receiving, at a receiver in a device, a signal that encodes digital information specific to a transmitter that varies according to an observation angle of the transmitter mapping to the receiver in the device, wherein the transmitter is in an environment;
- estimating, by one or more processors of the device, distance and direction of the transmitter in the environment based at least in part on the received signal evaluated with respect to the observation angle mapping to the transmitter; and
- processing, by the one or more processors, the encoded digital information in the signal based at least in part on the estimated distance and direction of the transmitter to display virtual content corresponding to a location of the transmitter in the environment.

19. The method as recited in claim 18, further comprising estimating the distance and the direction of the transmitter in world coordinates of the transmitter.

20. The method as recited in claim 18, wherein the signal is a light signal, wherein the transmitter emits light at wavelengths that vary with a 1:1 correspondence to observation angle, and wherein estimating direction of the transmitter in the environment based on the received signal comprises estimating the direction of the transmitter based on wavelength of the signal received at the receiver.

\* \* \* \* \*